United States Patent
Kaneda et al.

[11] Patent Number: 5,958,067
[45] Date of Patent: Sep. 28, 1999

[54] ARRAY TYPE DISK SYSTEM UPDATING REDUNDANT DATA ASYNCHRONOUSLY WITH DATA ACCESS

[75] Inventors: Yasunori Kaneda; Takashi Oeda; Kiyoshi Honda; Naoto Matsunami; Hitoshi Akiyama; Hiroshi Arakawa, all of Yokohama; Minoru Yoshida, Odawara; Ikuya Yagisawa, Yokohama, all of Japan

[73] Assignee: Hitachi, Ltd., Tokyo, Japan

[21] Appl. No.: 08/964,227

[22] Filed: Nov. 4, 1997

Related U.S. Application Data

[63] Continuation of application No. 08/312,791, Sep. 27, 1994, Pat. No. 5,761,402, which is a continuation-in-part of application No. 08/199,838, Feb. 22, 1994.

[30] Foreign Application Priority Data

| Mar. 8, 1993 | [JP] | Japan | 5-46786 |
| Sep. 27, 1993 | [JP] | Japan | 5-239910 |
| Jun. 30, 1994 | [JP] | Japan | 6-148983 |

[51] Int. Cl.⁶ ................... G06F 11/00
[52] U.S. Cl. ............................... 714/6
[58] Field of Search ............. 395/182.04, 425, 395/439, 440, 441, 453; 371/40.1, 40.2, 40.3, 40.4, 51.1; 711/161, 162, 112, 113, 114, 118, 126; 364/243, 243.41, 248.1, 944.92, 964; 714/6, 763, 764, 765, 766, 805

[56] References Cited

U.S. PATENT DOCUMENTS

| 5,206,943 | 4/1993 | Callison et al. | 395/425 |
| 5,375,128 | 12/1994 | Menon et al. | 371/40.1 |
| 5,418,921 | 5/1995 | Cortney et al. | 395/425 |
| 5,506,979 | 4/1996 | Menon | 395/439 |
| 5,526,482 | 6/1996 | Stallmo et al. | 395/182.04 |
| 5,530,948 | 6/1996 | Islam | 395/183.04 |
| 5,617,530 | 4/1997 | Stallmo et al. | 396/182.04 |
| 5,708,668 | 1/1998 | Styczinski | 371/40.1 |

FOREIGN PATENT DOCUMENTS

4245352 9/1992 Japan.

OTHER PUBLICATIONS

"Performance Consequences of Parity Placement in Disk Arrays", E.K. Lee and R.H. Katz; pp.190–199, 9–1991, ACM.

"A Case for Redundant Arrays of Inexpensive Disks (RAID)", D.A. Patterson, G. Gibson, and R.H. Katz; (24 pp.), 12–1987, Report No. UCB/CSD 87/301, Univ of CA/Berkeley.

"Feature Articles: Disk Array Systems", Nikkei Electronics, No. 579, Apr. 26, 1993, pp. 77–103). (Not in English, But Considered Only Insofar As To Applicants Statement of Relevamce) SE.

Primary Examiner—Ly V. Hua
Assistant Examiner—Stephen C. Elmore
Attorney, Agent, or Firm—Antonelli, Terry, Stout & Kraus, LLP

[57] ABSTRACT

In a disk array system, data read out and data written anew are temporarily held as former data in a former data holding portion. When a write operation has occurred, a CPU searches the holding portion for write data, it generates update data from the new and former write data items, and it holds the generated update data in an update data holding portion. In addition, the CPU stores the storage address of redundant data associated with the held update data, as log data in a log data holding portion. Further, the CPU operates asynchronously with the write operation to read out the redundant data of the address of the holding portion, to calculate new redundant data from the read redundant data and the held update data, and to write the new redundant data into the address of the log data. On this occasion, a parity area and a data area are separated so as to heighten read/write processing speeds and a parity generation processing speed.

1 Claim, 17 Drawing Sheets

FIG.2
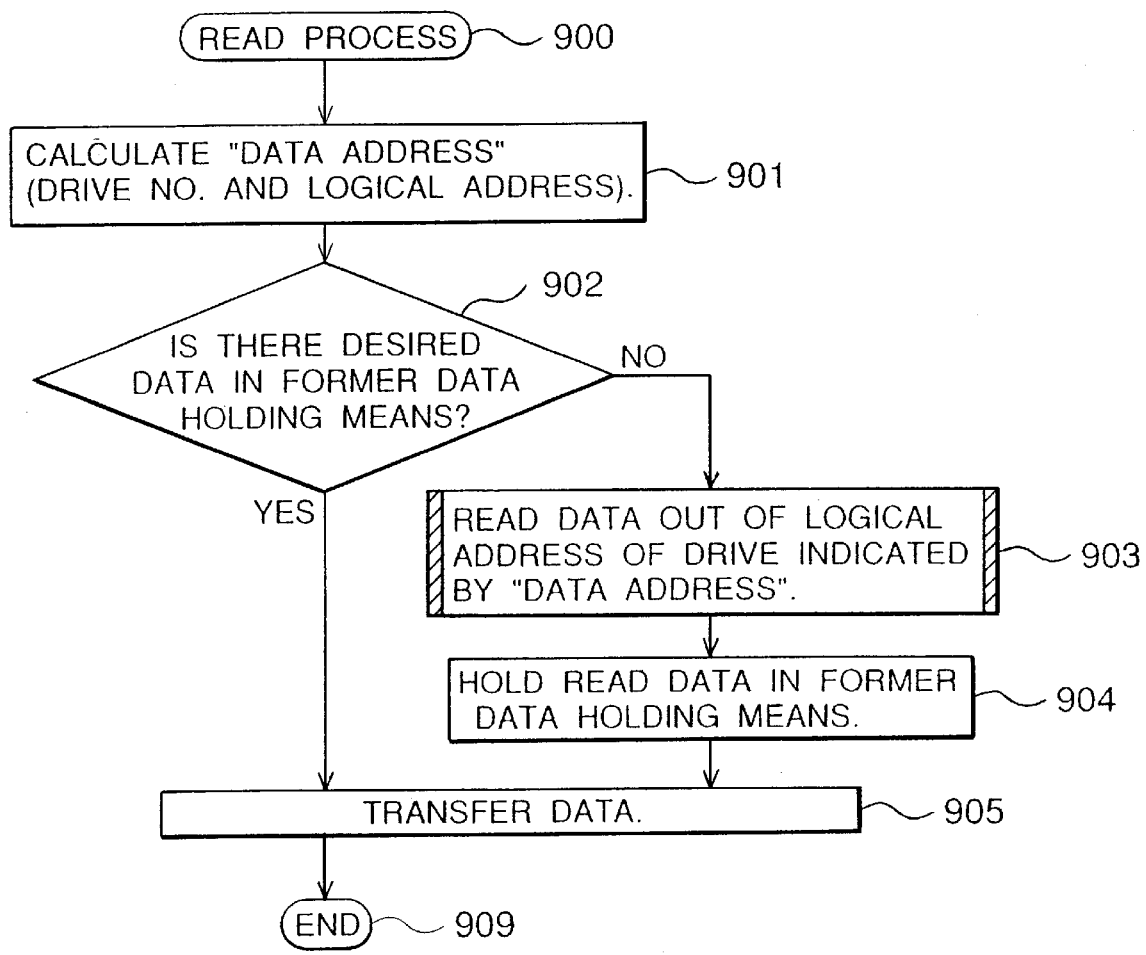
 : ACCESS TO DATA AREA

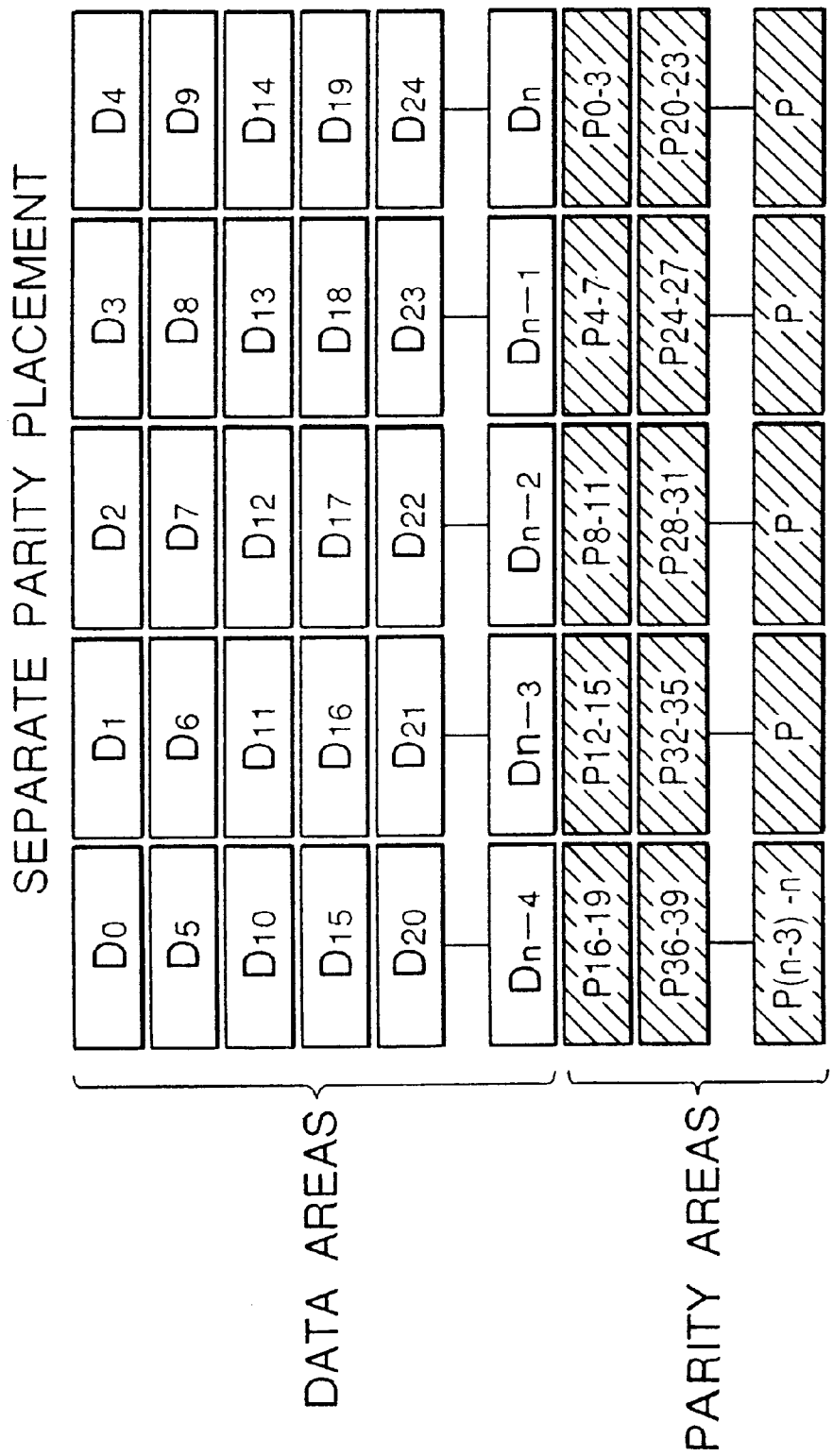
FIG.10C SEPARATE PARITY PLACEMENT

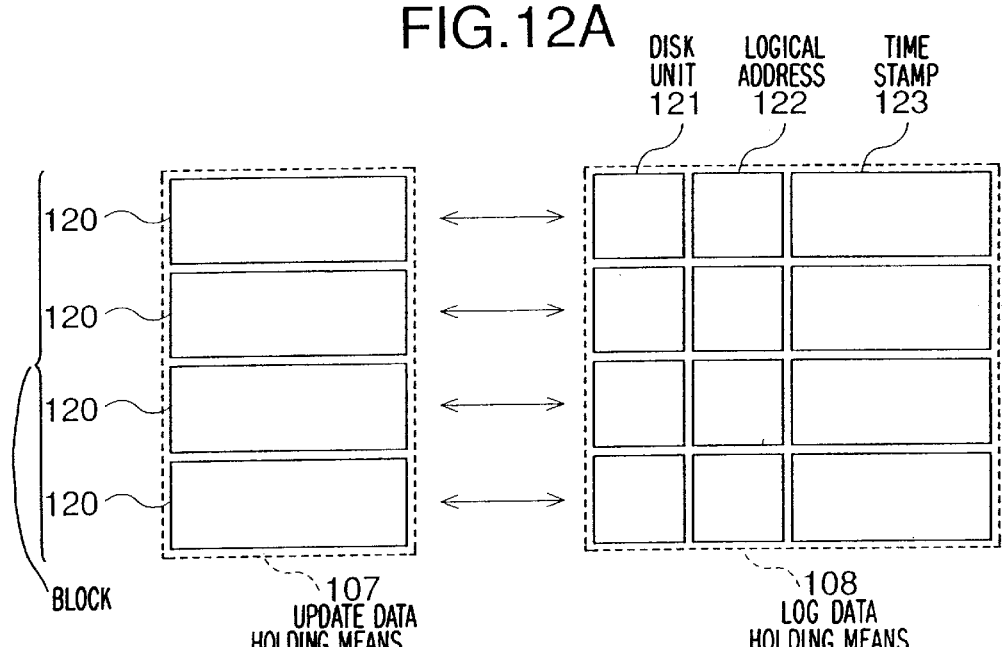
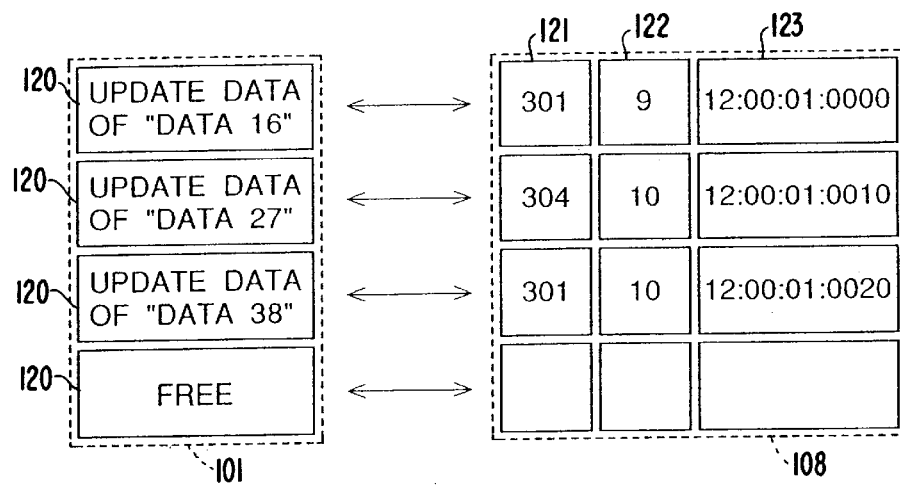
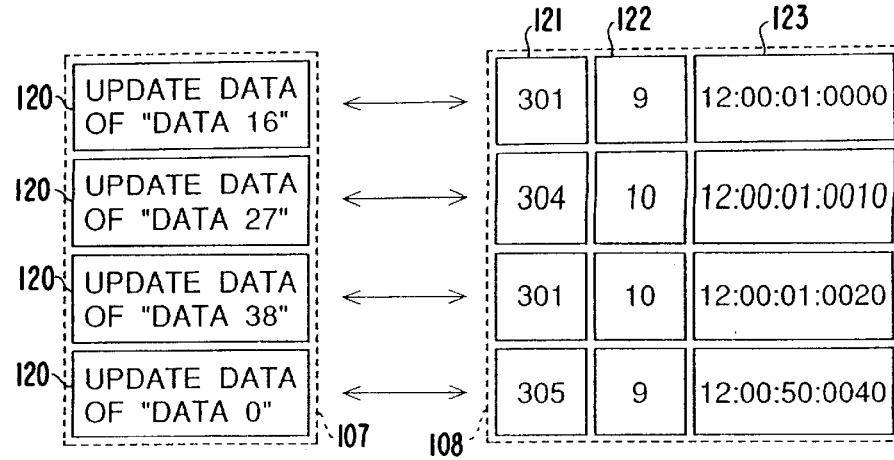

ARRAY TYPE DISK SYSTEM UPDATING REDUNDANT DATA ASYNCHRONOUSLY WITH DATA ACCESS

This application is a continuation of application Ser. No. 08/312,791, filed Sep. 27, 1994, now U.S. Pat. No. 5,761,402 which is a continuation-in-part of co-pending U.S. application Ser. No. 08/199,838 filed on Feb. 22, 1994 entitled "DISK ARRAY CONTROL SYSTEM" which is incorporated herein by reference.

BACKGROUND OF THE INVENTION

1. Field of the Invention

The present invention relates to an array type disk system in which a plurality of disk units are arranged in the form of arrays and which is used as the storage system of a computer system, and also to a method of controlling the array type disk system. More particularly, it relates to a technique for the optimization of a method of updating redundant data.

2. Description of the Related art

A disk array system (RAID: Redundant Arrays of Inexpensive Disks), that is, an external memory whose read/write speeds are heightened by the parallel operations of a plurality of magnetic disk units and whose reliability is enhanced by a redundant construction, has been proposed in lieu of a magnetic disk unit (a hard disk unit) which has heretofore been employed as a single unit (paper: "A Case for Redundant Arrays of Inexpensive Disks (RAID)", David A. Patterson, Garth Gibson, and Randy H. Katz, Computer Science Division, Department of Electrical Engineering and Computer Sciences, University of California Berkeley). In the paper, Nos. 1 thru 5 are assigned to the levels of the disk array system in accordance with the constructions thereof. It is well known that enhancement in performance is expected of RAID Level-3 as to a sequential access mode in which a large amount of data are transferred, while enhancement in performance is expected of RAID Level-5 as to a random access mode in which data of small sizes are often read and written ("Feature Articles: Disk Array Systems" in NIKKEI ELECTRONICS, Apr. 26, 1993 No. 579, pp. 77–91).

FIG. 10A illustrates the relationship between storage data and parity data in the RAID Level-3 construction (4-data 1-parity configuration). In addition, FIG. 10B illustrates the relationship between storage data and parity data in the RAID Level-5 construction (4-data 1-parity configuration). In each of FIGS. 10A and 10B, numerals 0 thru 19 denote the locations of the storage data, while symbols P0-3 thru P16-19 denote the parity data of the corresponding storage data. By way of example, the parity data P0-3 corresponds to the storage data 0 thru 3. At the RAID level-3, byte stripes are employed, and a parity disk is fixed. On the other hand, at the RAID level-5, the parity data are distributively recorded on the respective disks. Thus, at this RAID level-5, processing steps can be prevented from concentrating in one parity disk in a parity update operation, and degradation in the performance of the disk array system in a write operation can be suppressed. In writing data, however, corresponding parity data needs to be simultaneously updated, so that the RAID Level-5 construction inevitably becomes inferior in the write performance to a disk system having no redundancy.

Here, when a read process is performed by the RAID Level-3 construction shown in FIG. 10A, the storage data of only four disk units are read out in parallel even in the presence of five disk drives because one disk unit is dedicated to the parity data. On the other hand, when a read process is performed by the RAID Level-5 construction shown in FIG. 10B, a waiting time for skipping the parity data recorded midway of the storage data is required, with the result that the read performance degrades.

Now, the read process and a write process which are based on a prior-art system will be explained in conjunction with FIG. 15, FIG. 16 and FIG. 17.

FIG. 17 illustrates an example of the architecture of the disk array system in the prior art. This system is broadly constructed of three sections; a host system 500, an array board 600, and a group of magnetic disk units 790 arranged in the form of arrays (magnetic disk units 701 thru 705).

The host system 500 is constituted by a CPU (Central Processing Unit) 501, a second cache 502, a chip set 503 and a main memory 505. The CPU 501, second cache 502 and chip set 503 are interconnected by a CPU bus 504.

The array board 600 is connected to the extension bus 509 of the host system 500 by the use of a bus interface 601. In addition to the bus interface 601, the array board 600 includes an MPU (Micro Processing Unit) 602 and five SCSI (Small Computer System Interface) controllers 603.

As stated above, the group of magnetic disk units 790 include the five magnetic disk units 701 thru 705. Each of the magnetic disk units 701 thru 705 has an SCSI controller 710, which is connected with the corresponding SCSI controller 603 of the array board 600 by cable. Besides, the group of magnetic disk units 790 stores therein storage data which are transferred from the host system 500, and parity data which are redundant data peculiar to such a disk array system.

Read Process

First, the read process will be explained with reference to FIGS. 15 and 17. FIG. 15 is a flow chart illustrative of the read process in the prior art. When an instruction for reading out data has been issued by an application or the like in the host system 500 (1500), that logical block address of the pertinent one of the disk units 701~705 at which the desired data is held is calculated by address conversion means which is implemented by the CPU 501 (1501). The calculated results shall be called the "data address". The desired data is read out of the logical address indicated by the "data address" (1502). That is, the pertinent disk unit in the group of magnetic disk units 790 is accessed to read the desired data. The desired data read out is delivered to the application or the like having issued the read instruction (1503). Then, the process is ended (1504).

Write Process

Next, the write process will be explained with reference to FIGS. 16 and 17. Hereinbelow, data to be written anew shall be called "new data", while old data corresponding to the "new data" shall be called "former data". The "former data" signifies data which is recorded in a logical block to have the "new data" written thereinto, in other words, data which is to be overwritten by the "new data" in the write process.

When an instruction for writing data has been issued by an application or the like in the host system 500 (1600), the address conversion means calculates the unit number and the logical block address ("data address") of the pertinent one of the disk units 701~705 to store the "new data". Further, the address conversion means calculates the unit number and the logical block address ("parity address") of the particular one of the disk units 701~705 storing parity data which corresponds to the "new data" (1601).

The "former data" is read out of the logical address of one of drives indicated by the calculated "data address" (1602), and "former parity" is read out of the logical address of one of the drives indicated by the calculated "parity address" (1603). Subsequently, "new parity" is calculated from the "former data", "former parity" and "new data" read out (1604). Further, the "new data" is written into the logical address of the drive indicated by the "data address" (1605), and the "new parity" is written into the logical address of the drive indicated by the "parity address" (1606). Then, the process is ended (1607).

Thus, in the data read process of the prior art, it suffices to once read the desired specific data out of the disk unit in which the specific data is stored. In contrast, the data write process requires four accesses to the disk units in total, due to the read and write steps of the disk unit storing the specific data therein and those of the disk unit storing the corresponding parity therein.

As stated above, in the prior-art disk array system, the parity update process is inevitably involved in the write mode, and the larger number of disk units must be accessed, resulting in the problem that the degree of multiplexing of the disk read and write processes lowers. As another problem, since the number of the accesses to the disk units increases, the performance of the disk array system in the write mode becomes inferior to that in the read mode.

Meanwhile, according to a technique disclosed in the official gazette of Japanese Patent Application Laid-open No. 245352/1992, the speed of a write process is heightened in such a way that a parity update process is made asynchronous with a write step by the use of a cache. Herein, the cache needs to be nonvolatile for maintaining matching between data and parity when a failure of power supply occurs.

The nonvolatile memory, however, is several times as expensive as a volatile memory for, e.g., a main storage and poses the problem of raising the cost of the whole disk system. Further, since the nonvolatile cache and management means therefor are arranged at a position at which the response rate of the cache is usually one order or more lower than that of the main storage, the technique has the problem that the nonvolatile cache is inferior in the cost performance to an ordinary volatile disk cache.

SUMMARY OF THE INVENTION

An object of the present invention is to provide an array type disk system and a control method therefor in which, in order to solve the problems of the prior art, the performance of a write process is prevented from degrading, and the speed of a parity update process is heightened.

Another object of the present invention is to provide an information processing system as well as an array type disk system and a control method therefor in which the throughput and the response performance of the whole system are enhanced.

Still another object of the present invention is to provide an array type disk system and a control method therefor in which the speeds of a parity update process and data throughput are heightened by employing a separate parity placement system (as shown in FIG. 10C).

Yet another object of the present invention is to provide an array type disk system and a control method therefor in which the higher speed of a write process, the higher speed of a parity update process and a long life of power supply can be realized by a simple construction of comparatively low cost.

A further object of the present invention is to provide an array type disk system and a control method therefor in which RAID functions are implemented by software, and the higher speeds of a write process and a parity update process can be realized by a simple construction of comparatively low cost.

A still further object of the present invention is to provide an array type disk system and a control method therefor in which the higher speed of a write process and/or the higher speed of a parity update process can be realized by a simple construction of comparatively low cost by utilizing a main memory in cache fashion.

In one aspect of performance of the present invention, an array type disk system includes:

a plurality of disk units which include a data area for storing data therein, and a parity area for storing redundant data corresponding to the stored data therein, and which are arranged in the form of arrays and are operated in parallel;

a disk control device which controls data accesses to the respective disk units; and a host computer system which commands the disk control device to access the respective disk units;

update data generation means for generating update data by performing an exclusive "or" operation on data before a write operation and data to be written when the data is to be first written into an address in a pertinent one of the disk units, and for generating new update data by performing an exclusive "or" operation on the data before the write operation, the data to be written and the generated update data when the data is to be written into the address in the pertinent disk unit again;

update data holding means for holding therein the update data generated by the update data generation means;

log data generation means for generating a parity address as log data in association with the held update data, the parity address being that address of a particular one of the disk units at which redundant data for the data of the data address is stored;

log data holding means for holding therein the log data generated by the log data generation means; and delayed parity generation means operating asynchronously with the process of writing the data into the pertinent disk unit, for reading the redundant data associated with the update data out of the parity address of the particular disk unit on the basis of the log data, for generating new redundant data on the basis of an exclusive "or" operation performed on read out redundant data read out and the update data associated therewith, and for writing the new redundant data into the particular disk unit on the basis of the log data.

Herein, read out data is held as former data. When a write process has occurred next, the former data corresponding to the write data of the write process is searched for, update data is generated using the corresponding former data and the data to be written this time, and the generated update data is held. In addition, the logical address of redundant data corresponding to the write data is held as log data. Thereafter, the data is actually written into the pertinent one of the disk units. Then, the write process ends. A delayed parity generation process is performed on the basis of the update data asynchronously with the write operation, whereby new parity is generated to actually update parity stored in the particular one of the disk units. On this occasion, the logical address of the data whose parity has been updated is deleted from the held log data.

Owing to the processing as stated above, the parity update process need not be performed at the step of writing the data, so that a processing speed at the write step can be prevented from lowering.

In addition, when a separate parity placement system is adopted, the movements of a write head during the parity update process can be limited within a parity area, so that the processing speed of the parity update step can be heightened.

Besides, the processing speed of the parity update step can be heightened still more by holding a plurality of items of update data and collectively processing those of the held data items whose corresponding parity data items have addresses lying in a predetermined range.

Further, when an array for writing storage data thereinto and an array for updating parity data therein are made separate from each other, the data write process and the parity update process can be performed in parallel, and the speed of the parity update process can be heightened.

The speed of the parity generation process can be heightened still more by forming the parity area in a nonvolatile memory.

Still further, the speeds of the read/write processes for the former data and former parity, the update data generation process, the read/write processes for the update data and the parity update process can be heightened in such a way that the former data, former parity and the update data are held in the memory of the host system.

Yet further, when the array for writing the storage data thereinto and the array for updating the parity data therein are made separate from each other, the data write process and the parity update process can be performed in parallel, and the speed of the parity update process in a multi-array construction can be heightened.

Furthermore, the log data are held in a nonvolatile memory whose contents are not erased at the failure of power supply. Therefore, even when the update data have been lost due to the occurrence of the the failure of the power supply, or the like, the parity data can be regenerated from the data of a parity group containing the addresses of the log data, after the recovery of the power supply. Thus, the disk system can be endowed with long life of the power supply at a lower cost than in the case of storing all the update data in the nonvolatile memory.

Moreover, since RAID functions are implemented by software, the power of a host side CPU can be effectively utilized. Besides, the main memory of the host system is utilized as a cache, and the number of SCSI channels to be provided in an array board is limited (decreased) for small-capacity uses. Thus, the construction of the disk system can be simplified, and the cost thereof can be sharply reduced.

Also, the response rate and data transfer rate of the disk system can be heightened by a host internal-bus direct-coupling system.

BRIEF DESCRIPTION OF THE DRAWINGS

FIG. 2 is a flow chart showing a read process in the first embodiment;

FIGS. 10A, 10B and 10C are diagrams for explaining parity placements in a RAID Level-3 construction, a RAID Level-5 construction and a separate parity placement system (Flat-Left-Symmetric system), respectively;

FIGS. 12A, 12B and 12C are diagrams each serving to explain the delayed parity generation process when a plurality of update data items are held;

PREFERRED EMBODIMENTS OF THE INVENTION

Now, the embodiments of the present invention will be described in conjunction with the accompanying drawings.

First Embodiment

Figure 1:
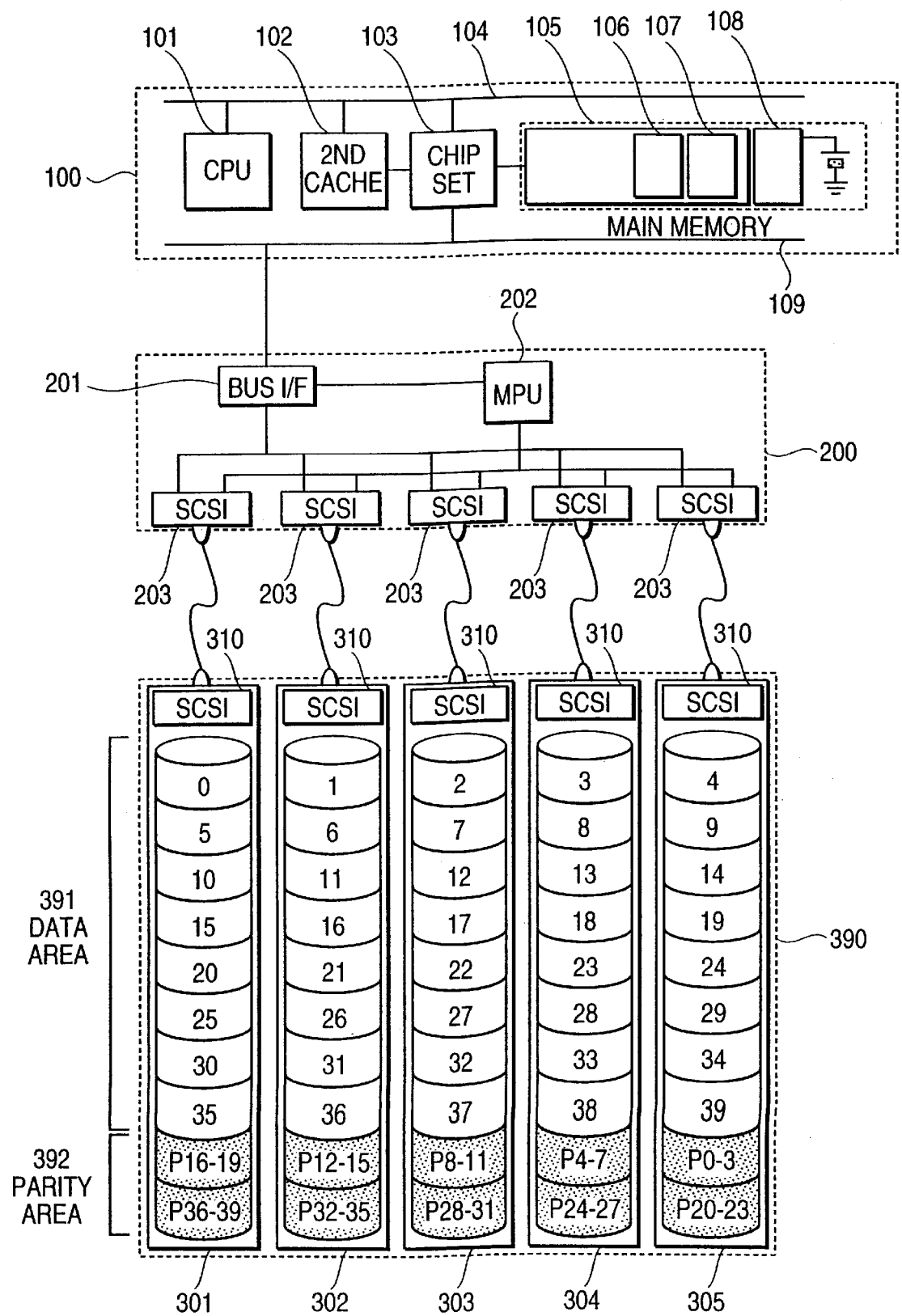
FIG. 1 is a block diagram showing a disk array system in the first embodiment of the present invention.

FIG. 1 illustrates the architecture of an array type disk system, namely, a disk array system to which the present invention is applied. This disk array system is broadly constructed of three sections; a host system 100, an array board 200, and a group of magnetic disk units 390 arranged in the form of arrays (magnetic disk units 301 thru 305).

The host system 100 is constituted by a CPU (Central Processing Unit) 101, a second cache 102, a chip set 103 and a main memory 105. The CPU 101, second cache 102 and chip set 103 are interconnected by a CPU bus 104, and they are distributively controlled. The main memory 105 is connected to the chip set 103, and it includes therein a former data holding portion 106, an update data holding portion 107, and a log data holding portion 108 rendered nonvolatile. Besides, an extension bus 109 is extended from the chip set 103.

The array board 200 is directly connected (directly coupled) to the extension bus 109 by the use of a bus interface 201 so as to attain a higher response rate and a higher data transfer rate. In addition to the bus interface 201, the array board 200 includes an MPU (Micro Processing Unit) 202, and SCSI (Small Computer System Interface) controllers 203 in the amount of, for example, five. By the way, when the number of magnetic disk units in the group of magnetic disk units 390 has been decreased, it is also possible to decrease the number of the SCSI controllers 203, to connect the decreased number of SCSI controllers 203 to the SCSI controllers 310 of the desired magnetic disk units, and to connect the SCSI controller 310 of any of the desired magnetic disk units thus connected, to the SCSI controller 310 of another of the magnetic disk units. That is, the array board 200 can be replaced with a new array board. It is also apparent that the array board 200 can be adapted for the group of magnetic disk units 390 otherwise.

Figure 10A:
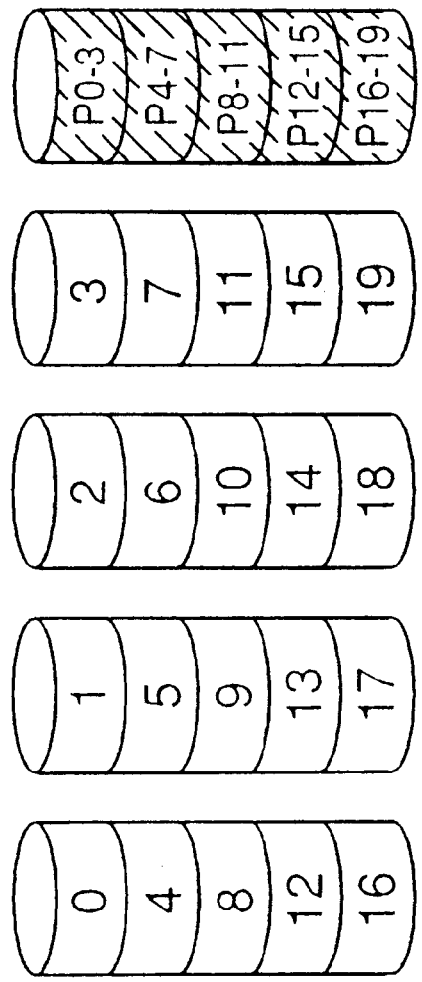
Figure 10B:
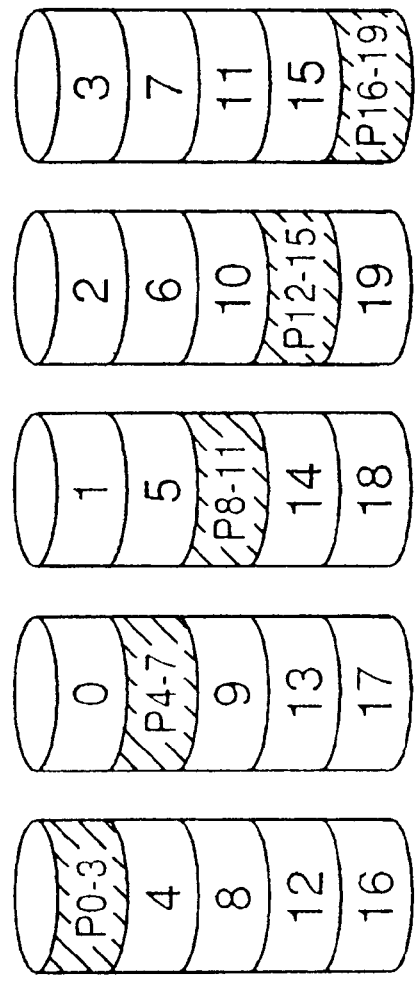

As mentioned above, the group of magnetic disk units 390 include the five magnetic disk units 301 thru 305 by way of example. Each of the magnetic disk units 301 thru 305 has the SCSI controller 310, which is connected with the corresponding SCSI controller 203 of the array board 200 by cable. Besides, the group of magnetic disk units 390 has a structure according to a separate parity placement process, which one of the characteristic features of the present invention, and are divided into data areas 391 for holding therein storage data which are transferred from the host system 100, and parity areas 392 for holding therein parity data which are redundant data peculiar to such a disk array system. Herein, a separate parity placement process will be described with reference to FIG. 10C. FIG. 10C shows an example in which a group of magnetic disk units consists of five disk units, which is more general than the case of FIG. 1. In FIG. 10C, $D_0$–$D_n$ are data areas, in which the parity of data stored in the data areas $D_0$–$D_3$ is stored. In FIG. 10C, the parity areas concentrate into one-fifth of the storage area of each disk unit. Accordingly, a total of the movement time (seeking time) of the head of a magnetic disk unit during the below-described delay parity generation process is reduced so that speed up of the delayed parity generation process can be achieved. In addition, since the parity areas are not mixed in the data areas, there is no need to skip the parity upon data reading so that the data reading time can be reduced. Furthermore, since it is possible to update parity in a plurality of parity areas which are not in a single disk unit at a given time, the time required for delayed parity generation process can be reduced. Moreover, the effect of parallel reading in the data area corresponds to the effect of five units so that the time required for data reading can also be reduced.

Figure 14:
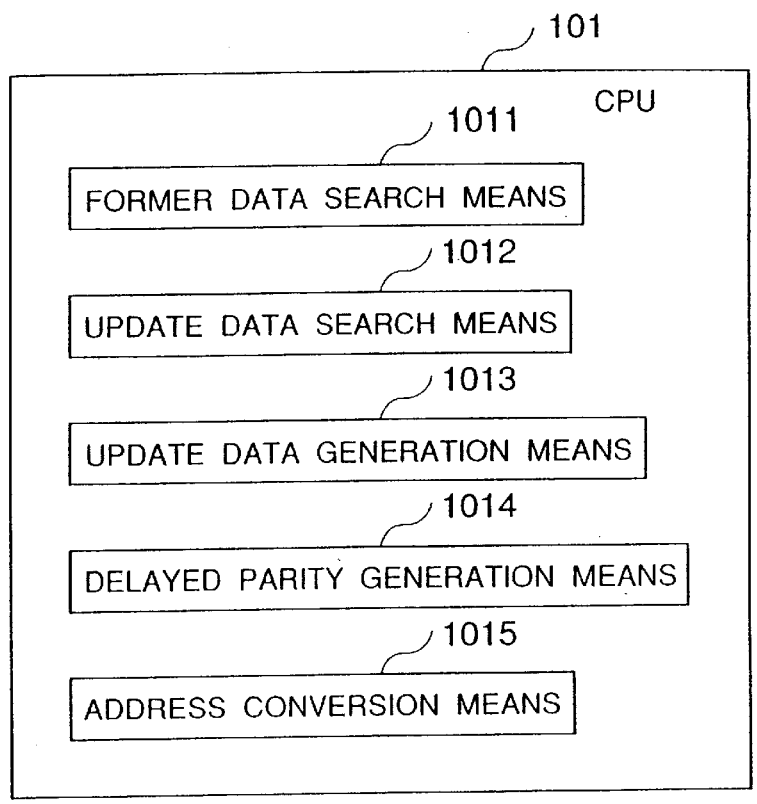
FIG. 14 is a functional block diagram of a CPU (101)
Figure 15:
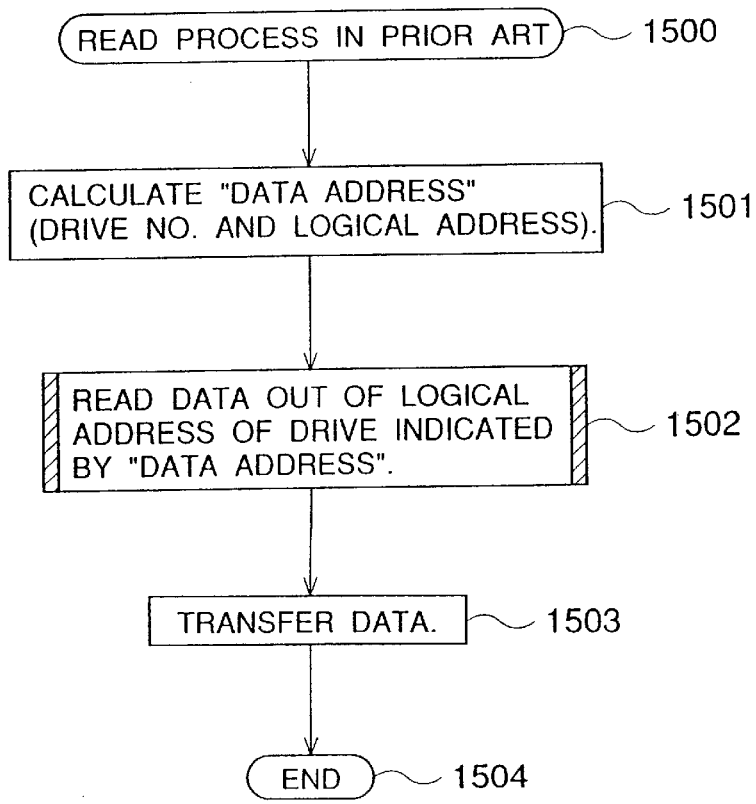
FIG. 15 is a flow chart showing a read process in the prior art.
Figure 16:
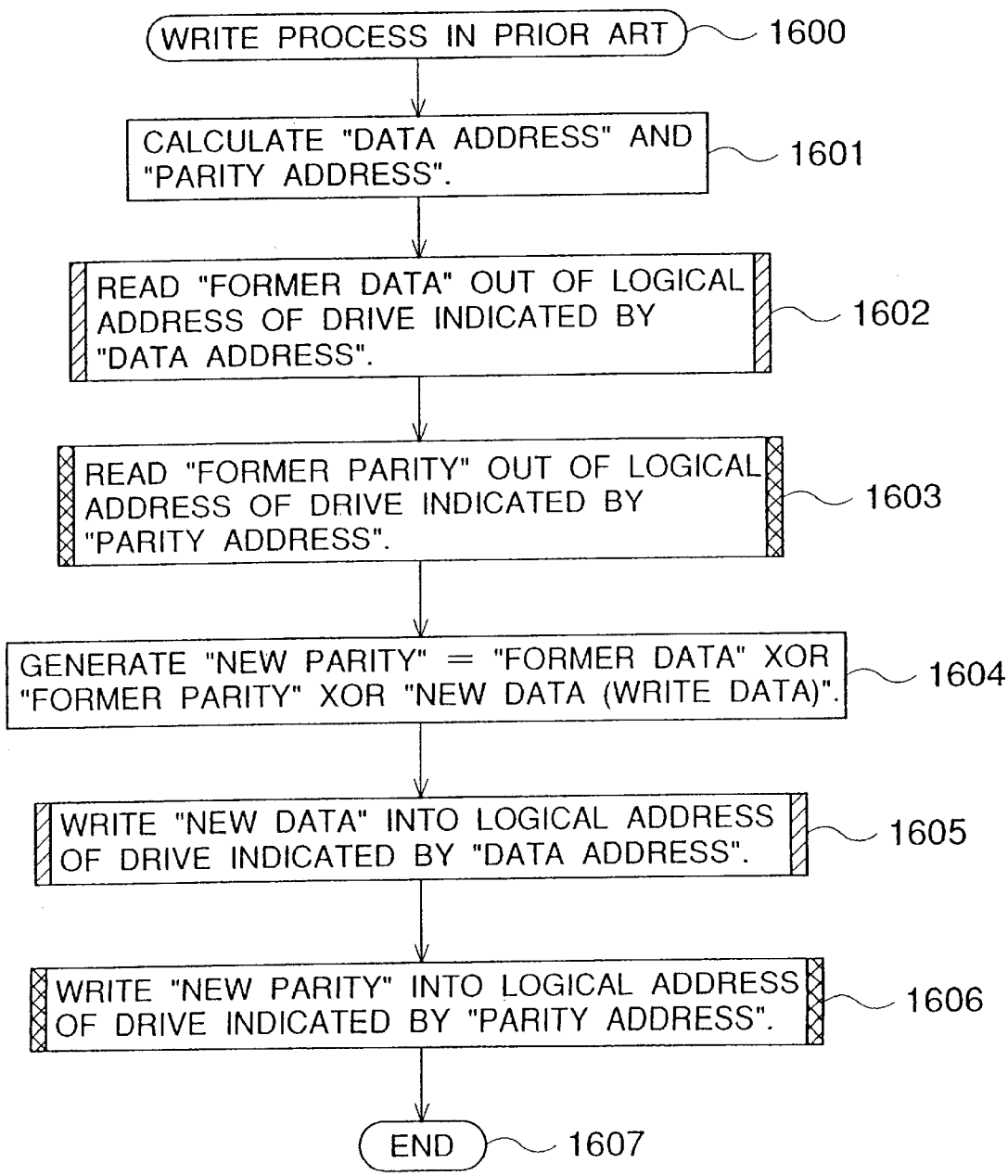
FIG. 16 is a flow chart showing a write process in the prior art.
Figure 17:
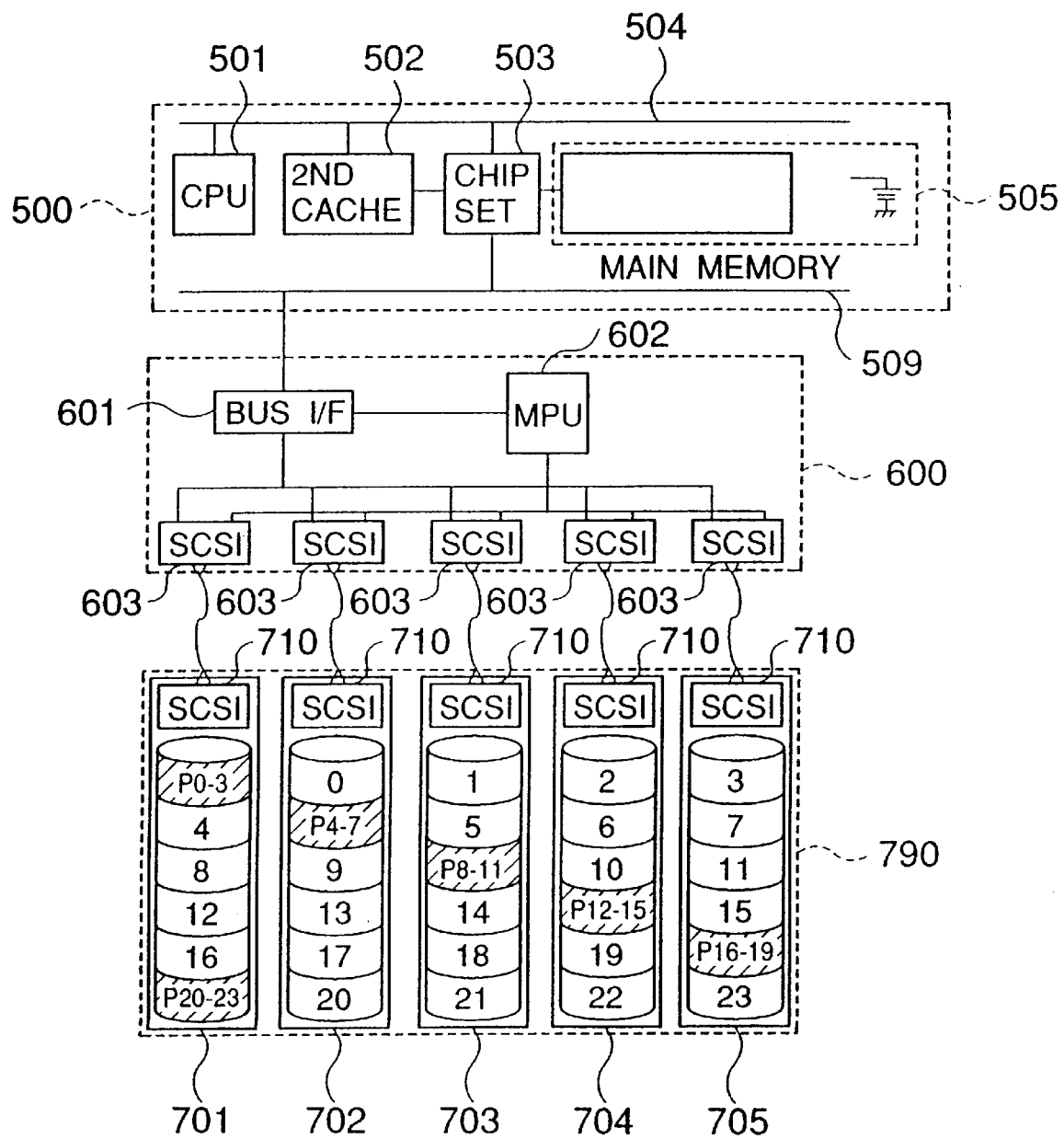
FIG. 17 is a block diagram showing a disk array system in the prior art.

Here, as illustrated in FIG. 14, former data search means 1011, update data search means 1012, update data generation means 1013, delayed parity generation means 1014, and address conversion means 1015 for data distribution/ collection processing peculiar to such an array disk system, are provided in accordance with the present invention and are implemented as software in the CPU 101. In other words, RAID (Redundant Arrays of Inexpensive Disks) functions are implemented by the software.

Figure 11:
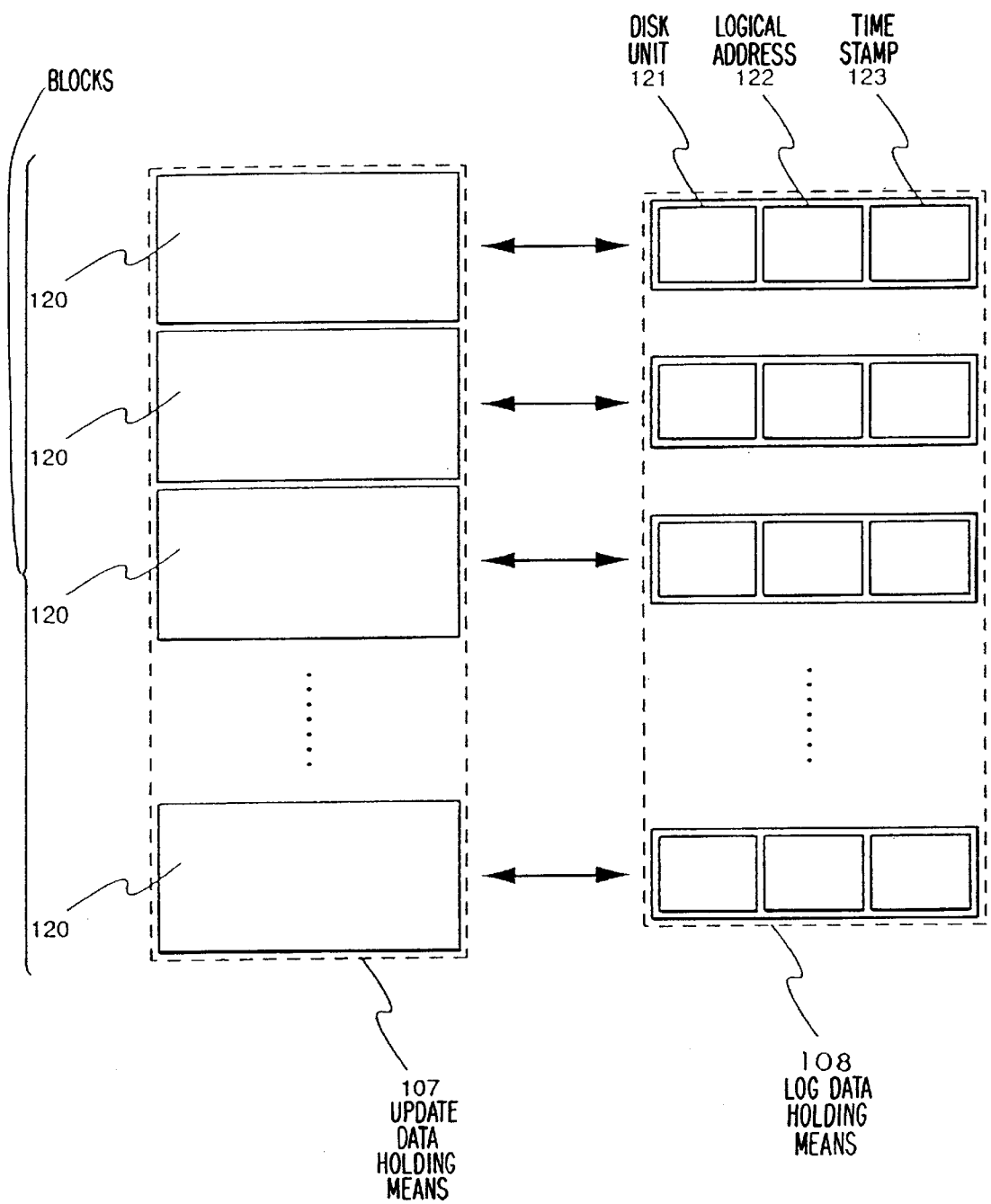
FIG. 11 is a diagram for explaining update data holding means and log data holding means.

FIG. 11 illustrates the construction of the update data holding means (portion) 107 and that of the log data holding means (portion) 108. The update data holding means 107 and the log data holding means 108 are adapted to hold the same number of data items as each other. By way of example, letting letter n denote a natural number, the nth data items of both the holding means 107 and 108 may correspond to each other. The update data holding means 107 is the aggregate of n memory areas each of which has a block size equal to the logical block length of each of the magnetic disk units 301~305 (the aggregate of n blocks 120). The number (n) of the blocks 120 included in the update data holding means 107, directly determines the number of "update data" items which can be subjected to a delayed parity update process. When the number of the blocks 120 is increased, the number of the "update data" items which can be held enlarges, and enhancements in the performances of the disk array system in a write process and a delayed parity generation process can be expected. In actuality, the update data holding means 107 is formed in the main memory 105, so that the number of the blocks 120 has its upper limit determined by the size of the main memory 105.

The log data holding means 108 is the arrayal of structures each of which chiefly contains the number of a disk unit, the address of a logical block in the disk unit, a time stamp, and a flag indicative of the status of the block. The structure is constituted by an area 121 for the disk unit number, an area 122 for the number of the logical address, and an area 123 for the time stamp etc. A "parity address" is intended to mean the disk unit number in the area 121 and the logical address number in the area 122. The number of the arrayed structures agrees with the number (n) of the blocks 120 of the update data holding means 107.

Specifically, assuming by way of example that the logical block length of each of the magnetic disk units is 4096 [bytes], the size of one block of the update data holding means 107 is 4096 [bytes]. When the update data holding means 107 has 1024 such blocks, it uses a memory space of 4 [MB]. Also, the log data holding means 108 has 1024 arrayal elements. Accordingly, assuming the sizes of the disk unit number, logical block number and time stamp to be 2 (bytes), 4 (bytes) and 4 (bytes), respectively, the log data holding means 108 uses a memory space of 10 (kB).

Regarding the former data holding means 106 provided in the main memory 105, it is considered to utilize the cache of a file system possessed by an OS (operating system). The cache of the file system of the OS has heretofore been used for holding "former data" therein. When the "former data" held in the cache are hit as data searched for, requests for the disk units can be decreased to heighten the processing speeds of the disk array system. Thus, in the case of utilizing the "former data" held in the cache of the file system, the required storage capacity of the main memory 105 can be suppressed to render the disk array system less expensive.

As stated above, the disk array system operates as the combinations of the functions fulfilled by the respective portions. It is therefore meaningless to draw a border line which isolates only the disk array system.

Here, a read process (a process for reading data) and a write process (a process for writing data) in the disk array system constructed as shown in FIG. 1 will be described. Further, a delayed parity generation process peculiar to the disk array system of the present invention will be described.

Read Process

First, the read process will be described with reference to FIGS. 1 and 2 with the number denoted in parenthesis corresponding to the method steps described in FIG. 2. When an instruction for reading out data has been issued by an application or the like in the host system 100 (900), that logical block address of the pertinent one of the disk units 301~305 at which the desired data is held is calculated by the address conversion means 1015 (901) which is included in CPU 101, as shown in FIG. 14. As stated before, the calculated results shall be called the "data address". The former data search means 1011 also included in CPU 101 (see FIG. 14), searches the former data holding means 106 for the desired data on the basis of the "data address" (902). Such "data addresses" and data stored at the addresses are held in association in the holding means 106. The search here can use, for example, a method based on the hash function. If the desired data exists in the former data holding means 106, it is transferred from the holding means 106 (905), whereupon the read process ends (909). Thus, the desired data can be read without accessing the group of magnetic disk units 390.

On the other hand, if the desired data does not exist in the former data holding means 106 (902), it is read out of the logical address indicated by the "data address" (903). That is, the desired data is read by accessing the group of magnetic disk units 390. The desired data read out is delivered to the application or the like having issued the read instruction (905), and it is also held in the former data holding means 106 (904), whereupon the read process ends (909). Here, the step 904 of holding the read-out data in the former data holding means 106 is intended to use the data at the next issue of a read instruction (to enhance the read hit ratio of the system), and to heighten the speed of the processing of the update data generation means 1013 at the next issue of a write instruction (in a read-modify-write mode).

Write Process

Next, the write process will be described with reference to FIGS. 1 and 3. Hereinbelow, data to be written anew shall be called "new data", while old data corresponding to the "new data" shall be called "former data". The "former data" signifies data which is recorded in a logical block to have the "new data" written thereinto, in other words, data which is to be overwritten by the "new data" in accordance with the write process.

When an instruction for writing data has been issued by an application or the like in the host system 100 (910), the address conversion means 1015 within CPU 101 calculates the unit number and the logical block address ("data address") of the pertinent one of the magnetic disk units 301~305 to store the "new data" (911). Further, the address conversion means 1015 calculates the unit number and the logical block address ("parity address") of the particular one of the magnetic disk units 301~305 storing parity data which corresponds to the "new data" (911).

Subsequently, the update data search means 1012 of CPU 101 searches for "update data" already generated, on the basis of the "parity address" (a capacity for storing update data can be decreased by providing up to one item of update data in correspondence with one "parity address") (912). The "update data" is obtained by calculating the exclusive "or" (XOR) between the "former data" and the "new data".

First, processing in the absence of the "update data" will be elucidated. The former data search means 1011 of CPU 101 searches the former data holding means 106 for the "former data" on the basis of the "data address" (913). On the condition that the "former data" does not exist, it is read out of that logical block in the group of magnetic disk units 390 which is indicated by the "data address" (914).

The update data generation means 1013 generates the "update data" on the basis of the exclusive "OR" (XOR) between the "former data" and the "new data" (915), and holds the result in the update data holding means 107 (916). Thereafter, the "new data" is written into the logical block of the magnetic disk unit of the unit number indicated by the "data address" (917), and it is also held in the former data holding means 106 (918). Further, the "parity address" is logged in the log data holding means 108 (919). Then, the write process is ended (929). Here, the "new data" held in the former data holding means 106 serves as "former data" at the next issue of a write instruction, whereby the processing speed of the update data generation means 1013 can be heightened. That is, "former data" read steps which arise in the update data processing can be decreased by cache hits. Of course, it is possible to conjointly employ the write-back-cache system which delays the operation of writing "new data" into a magnetic disk. Thus, the disk accesses can be decreased still more. In general, however, data in the main memory 105 are lost at the time of the failure of power supply, and hence, a countermeasure such as the additional provision of an uninterruptible power equipment is required.

Next, processing in the presence of the "update data" will be elucidated. The former data search means 1011 searches the former data holding means 106 for the "former data" on the basis of the "data address" (920). On the condition that the "former data" does not exist, it is read out of the logical block of the magnetic disk unit of the unit number indicated by the "data address" (921).

The update data generation means 1013 generates new "update data" on the basis of the exclusive "OR" (XOR) among the existent "update data", the "former data" and the "new data" (922), and overwrites the result into the update data holding means 107 (923). Thereafter, the "new data" is written into that logical block of the group of magnetic disk units 390 which is indicated by the "data address" (917), and it is also held in the former data holding means 106 (918). Further, the "parity address" is logged in the log data holding means 108 (919). Then, the write process is ended (929).

As described above, in the write process of the disk array system according to the present invention, only the operation of writing the storage data is performed without performing the operations of generating parity and writing the generated parity. Therefore, only the data areas 391 of the group of magnetic disk units 390 are accessed for the read/write operations. In the case of conjointly employing the write-back-cache system, the read/write operations of the data areas 391 can be delayed or omitted. In the write process, accordingly, the number of the disk units to be accessed and the number of times of accesses decrease to realize the higher speed of the write process. Moreover, the processing speed of the update data generation means 1013 in the read-modify-write mode is heightened by utilizing the "former data" stored in the former data holding means 106.

Delayed Parity Generation Process

Figure 4:
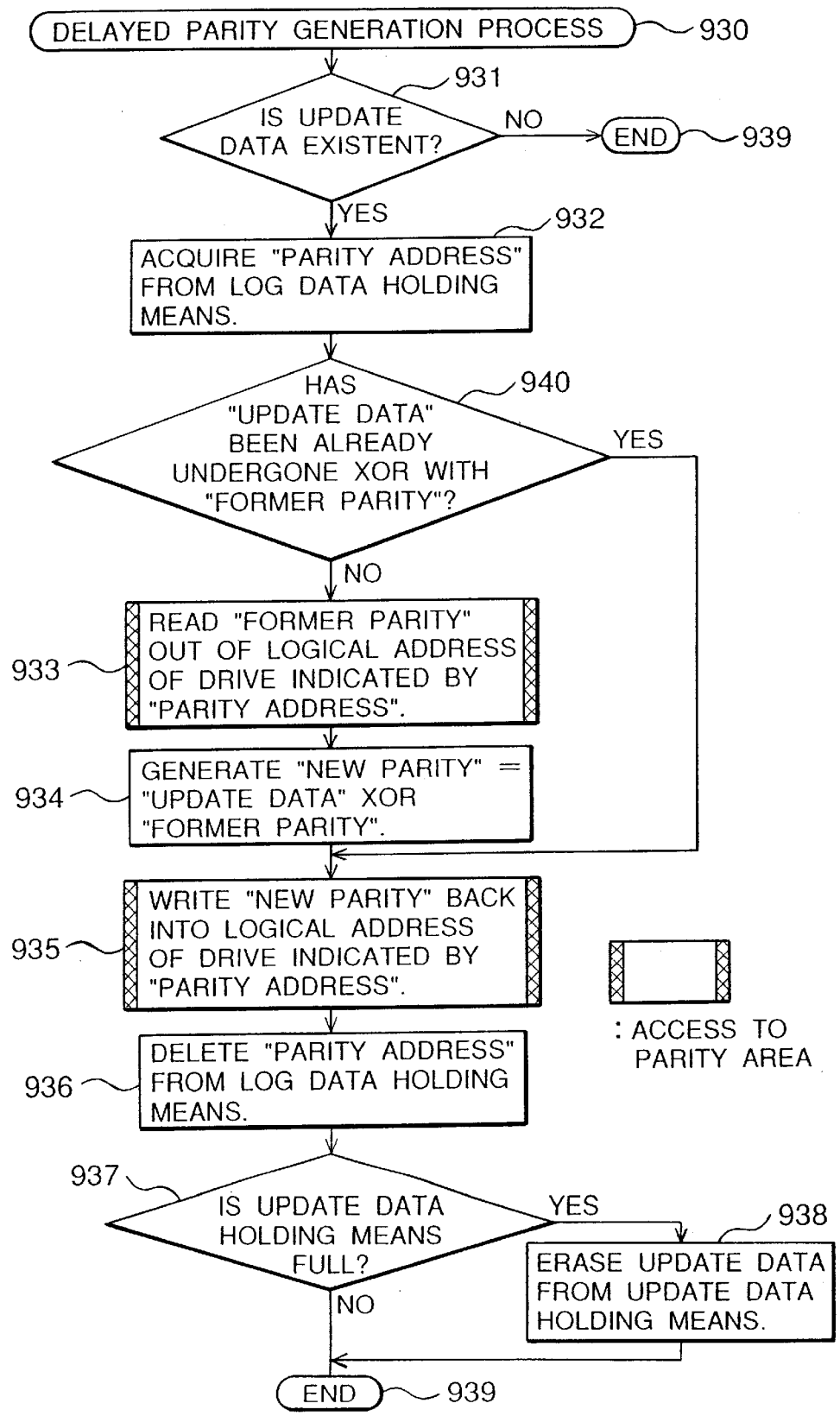
FIG. 4 is a flow chart showing a delayed parity generation process in the first embodiment.

In the disk array system, parity data is generated for an enhanced reliability. In the disk array system according to the present invention, a parity generation process is not performed at the time of the write process, but a delayed parity generation process is performed. The delayed parity generation process is a process which is performed asynchronously with a write instruction issued by the application or the like of the host system 100. This delayed parity generation process will be described with reference to FIGS. 1 and 4 with the method steps of FIG. 4 being denoted in parenthesis.

The delayed parity generation process is started asynchronously with the write process (930). Considered as the timings of the start of the delayed parity generation process are, for example, the time at which the frequency of accesses to the disk drives is low, the time at which "update data" items have been generated in a number larger than the number (at least one) of "update data" allowed to be stored in the update data holding means 107, and the time at which the power supply of the system has been turned off.

The update data search means 1012 searches the update data holding means 107 for the "update data" (931). If the "update data" does not exist, the delayed parity generation process ends (939). On the other hand, when the "update data" does exist, the address conversion means 1015 calculates the "parity address" being that address of any of the parity areas 392 at which parity data corresponding to the "update data" is stored (932) (actually, the "parity address" logged in the log data holding means 108 is read out). On condition that the "update data" indicated by the "parity address" has never been subjected to the exclusive "OR" (XOR) with "former parity" (940), the parity data already recorded (called the "former parity") is read out of the logical block indicated by the "parity address" (933). Further, the XOR between the "update data" and the "former parity" is calculated to generate new parity data (called "new parity") (934). It is to be understood that the "update data" subjected to the XOR with the "former parity" even once has become the "new parity" (940). The "new parity" is written back into the logical block indicated by the "parity address" (935), and the "parity address" is deleted from the log data holding means 108 (936). Subsequently, a determination is made as to whether the update data holding means 107 is full (937) (actually, a threshold value is set for the update data holding means 107). On the condition that the update information holding means 107 has room, the "new parity" is held as the "update data". The "update data" held here has once undergone the XOR with the "former data". Owing to the holding of this "update data", the read-out of the "former parity" can be reduced once if at all, in the delayed parity generation process, so that the speed of the delayed parity generation process can be heightened.

Here, the effect of the log data holding means 108 will be explained. As stated before, in the disk array system, the parity data is generated and then held in order to maintain reliability. In the disk array system of the present invention, however, only the "update data" is generated without updating the parity in the disk unit in the data write operation, and the delayed parity generation process is thereafter executed asynchronously. In this case, when such a situation as the service interruption of the power supply has taken place before the execution of the delayed parity generation process, the matching between the storage data and the parity data fails to be maintained. Therefore, the "parity addresses" not processed are logged in the log data holding means 108. Thus, even when the "update data" have been lost due to the service interruption or the like, the logical addresses at which the parity data are to be generated again can be known from the storage data already recorded in the magnetic disk units, at the next start of the disk array system. By way of example, it is assumed in FIG. 1 that the failure of the power supply has occurred after the update of "data 10" stored in the magnetic disk unit 301, so the update data which is not yet reflected at a location "P8-11" in the magnetic disk unit 303 yet is lost. When the disk array system is left as it is after the recovery of the power supply, the storage data "data 10" and the parity data "P8-11" remain mismatched. Accordingly, when any of the magnetic disk units 301~305 has failed, that of data items "data 8"~"data 11" which belongs to the magnetic disk unit having failed cannot be correctly recovered. In contrast, in this embodiment, the log data holding means 108 is nonvolatile, so that the unprocessed "parity address", namely, the address of the location "P8-11" is held even at the failure of the power supply. Therefore, the parity of the parity area 392 whose address is logged in the log data holding means 108 is regenerated after the recovery of the power supply. On this occasion, the parity data "P8-11" can be regenerated by calculating the exclusive OR among the storage data "data 8"~"data 11". Of course, the update data holding means 107 may well be rendered nonvolatile. However, a nonvolatile memory is several times as expensive as a volatile memory, and the data block size is about 1000 times as large as the address size. It is accordingly understood that the expedience of this embodiment can endow the disk array system with a long life of the power supply more inexpensively than the prior art. Incidentally, the parity address which is logged in the nonvolatile storage means need not always be the unprocessed "parity address" itself, but it may well be replaced with a range including the "parity address". Thus, the storage capacity of the expensive nonvolatile storage means can be decreased. In this case, after the recovery of the power supply, the matching between the storage data and the parity data in the range is checked, and the mismatching parity data item or all the parity data items in the range is/are regenerated.

In the above explanation of each of the read process, write process and delayed parity generation process, there has been mentioned the case where one item of data is held in each of the update data holding means 107 and the log data holding means 108. When a plurality of data items are held in each of the update data holding means 107 and the log data holding means 108, the speed of the parity generation process can be heightened in such a way that, among the "update data" items held in the update data holding means 107, "update data" items corresponding to adjacent "parity addresses" are collectively subjected to the delayed parity generation process every disk unit. Moreover, since the separate parity placement system is adopted, a head moving range in the case of consecutively executing a plurality of parity generation processes does not extend over all the disk areas, but it is limited to the parity areas 392, so that the speed of the parity generation processes can be heightened. Further, the processing speed can be made still higher through the optimization of a process execution sequence, such as the successive executions of the processes from a block having the smallest address.

The log data holding means 108, update data holding means 107 and former data holding means 106 may well be situated in the array board 200 or an external memory, not in the main memory 105. Also, the log data holding means 108 may well be situated in the group of magnetic disk units 390.

Practical Example Read-Modify-Write Process

Now, a practicable example on the flow of data will be described with reference to FIG. 1. In this example, the "data 10" stored in the magnetic disk unit 301 in FIG. 1 is subjected to a read-modify-write process. The read-modify-write process is a process in which an application reads out data, modifies or corrects the data and thereafter writes back the modified or resulting data.

When the application in the CPU 101 has made a request for the "data 10", the address conversion means 1015 calculates the unit number and logical block address of the magnetic disk unit storing the "data 10" (as a "data address"). The "data address" in this case corresponds to the third logical block in the magnetic disk unit 301. The former data search means 1011 searches the former data holding means 106 for the "data 10" on the basis of the "data address". Here, when the "data 10" has never been read out since the closure of the power supply of the disk array system, it does not exist in the former data holding means 106. Therefore, the "data 10" is read out of the third logical block of the magnetic disk unit 301 indicated by the "data address". The content of the "data 10" is delivered to the application having made the request for this "data 10", and it is held in the former data holding means 106 along with the "data address".

Upon receiving the "data 10", the application modifies the read "data 10" and thereafter makes a request for the write process of the resulting "data 10".

When the write process has been issued, the address conversion means 1015 calculates the unit number and logical block address of the magnetic disk unit storing the "data 10" (as a "data address"). In addition, it calculates the unit number and logical block address of the magnetic disk unit storing parity which is to be modified by rewriting the "data 10" (as a "parity address"). The "data address" in this case corresponds to the same third logical block of the magnetic disk unit 301 as in the read process. Besides, the "parity address" corresponds to the ninth logical block "P8-11" in the magnetic disk unit 303.

First, the update data search means 1012 searches the update data holding means 107 for "update data" corresponding to the "data 10" on the basis of the "parity address". Here, when the "data 10" has never been written due to the closure of the power supply of the disk array system, the "update data" corresponding to the "data 10" does not exist in the update data holding means 107.

Subsequently, the former data search means 1011 searches the former data holding means 106 for the "data 10" before the modification (called "former data 10") on the basis of the "data address". The "former data 10" has been held in the former data holding means 106 in the foregoing read process). Therefore, the "former data 10" need not be read out of the magnetic disk unit anew, and the processing for the magnetic disk unit can be reduced one time.

The update data generation means 1013 calculates the exclusive OR (XOR) between the "former data 10" and the modified "data 10" (called "new data 10"), thereby generating the "update data". This "update data" is held in the update data holding means 107. Thereafter, the "new data 10" is written back into the third logical block of the magnetic disk unit 301 indicated by the "data address". Besides, the "new data 10" is written into the former data holding means 106. At this time, the "new data 10" is written over the "former data 10" held in the former data holding means 106. Further, the "parity address" corresponding to the "data 10" is held in the log data holding means 108. Owing to the log data holding means 108, it is logged that the parity of the ninth logical block of the magnetic disk unit 303 herein needs to be modified.

In the disk array system according to the present invention, neither of read/write processes arises for any data other than the "data 10" being the desired data, as in the read-modify-write process stated above.

Further, in the disk array system of the present invention, the delayed parity generation process is performed asynchronously with the write process of the application. The delayed parity generation means 1014 is monitoring the loaded conditions of the individual magnetic disk units, the situation of use of the update data holding means 107, etc. so as to start the delayed parity generation process at the optimum timing.

When neither of read/write operations for the magnetic disk units has occurred for a predetermined time period since the end of the foregoing write process of the "data 10" as requested by the application, the delayed parity generation means 1014 starts the delayed parity generation process. First, the update data search means 1012 searches the update data holding means 107 for the "update data". In this example, the "update data" corresponding to the "data 10" does exist. The update data search means 1012 fetches the "parity address" of the "data 10" from the log data holding means 108. The "former parity" is read out of the ninth logical block of the magnetic disk unit 303 indicated by the "parity address", the exclusive "or" (XOR) between the "former parity" read out and the "update data" corresponding to the "data 10" in the update data holding means 107 is calculated to obtain the "new parity", and this "new parity" is written back into the ninth logical block of the magnetic disk unit 303 indicated by the "parity address". Since the parity has been thus updated, that information of the ninth logical block of the magnetic disk unit 303 which is the "parity address" of the "new parity" is erased from the log data holding means 108.

Practical Example Delayed Parity Update Process Which Collectively Handles "Update Data" Corresponding To Adjacent Parity Addresses Next, the operation of a delayed parity update process in the case of collectively executing a plurality of delayed parity generation processes will be described. When the delayed parity update process has been started, the update data search means 1012 searches the update data holding means 107 for "update data". In the search for the "update data", the update data search means 1012 seeks "update data" items which correspond to "parity addresses" adjoining the "parity address" of the reference "update data" (lying in a prescribed range). In the presence of the "update data" items corresponding to the adjacent "parity addresses", these "update data" items are collectively subjected to the delayed parity update process.

Now, a practical example of the flow of data in the delayed parity update process, in which the delayed parity generation processes are collectively performed, will be described with reference to FIG. 1, FIGS. 12A~12C and FIG. 13. In FIGS. 12A~12C, the number of blocks 120 included in the update data holding means 107 is assumed to be four, as an example for the sake of brevity of the description. Accordingly, the number of arrayal elements in the log data holding means 108 becomes four. The elements of the log data holding means 108 are respectively held in one-to-one correspondence with the blocks of the update data holding means 107.

Figure 3:
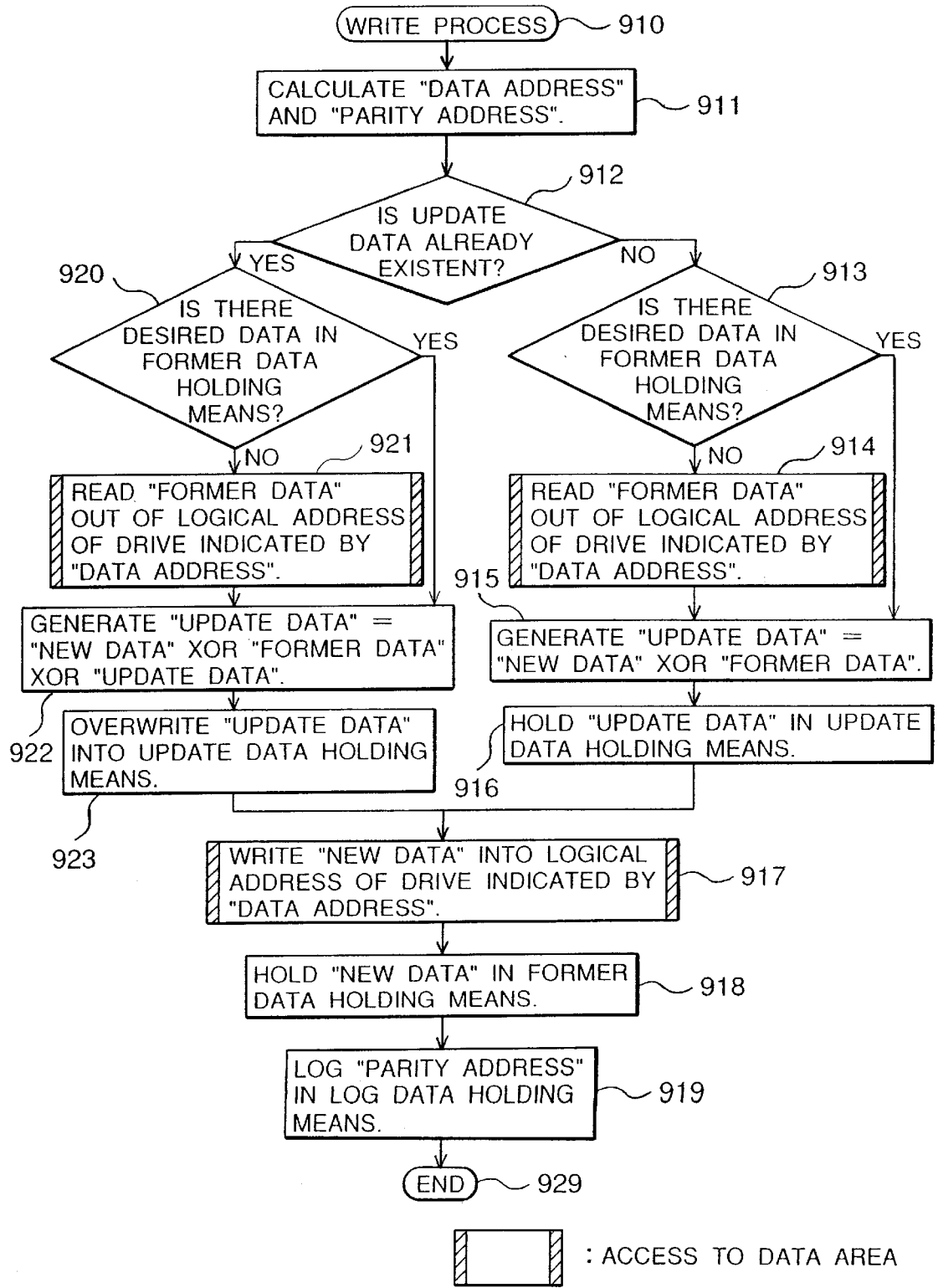
FIG. 3 is a flow chart showing a write process in the first embodiment.

As illustrated in FIG. 3, when the write process is performed, the "update data" is generated (915, 922) and is stored in the update data holding means 107 (916, 923). Besides, the "parity address" is stored in the log data holding means 108 (919). It is supposed in FIG. 1 that such write processes have occurred in the order of "data 16", "data 27" and "data 38". Then, as shown in FIG. 12B, the "update data" items of the "data 16", "data 27" and "data 38" are respectively held in the blocks 120 of the update data holding means 107, while information items such as the "parity addresses" are held in the respectively corresponding elements of the log data holding means 108. Regarding the "parity addresses" of the log data items which are held in this example, the "data 16" corresponds to the ninth logical block of the magnetic disk unit 301, the "data 27" the tenth logical block of the magnetic disk unit 304, and the "data 38" the tenth logical block of the magnetic disk unit 301.

It is supposed that the write processes have subsequently occurred in the order of "data 0" and "data 5". Then, as shown in FIG. 12C, all of the blocks of the update information holding means 107 are filled up when the update data of the "data 0" has been held. Therefore, the delayed parity generation processes must be executed before holding "update data" involved in the write process of the "data 5".

Figure 13:
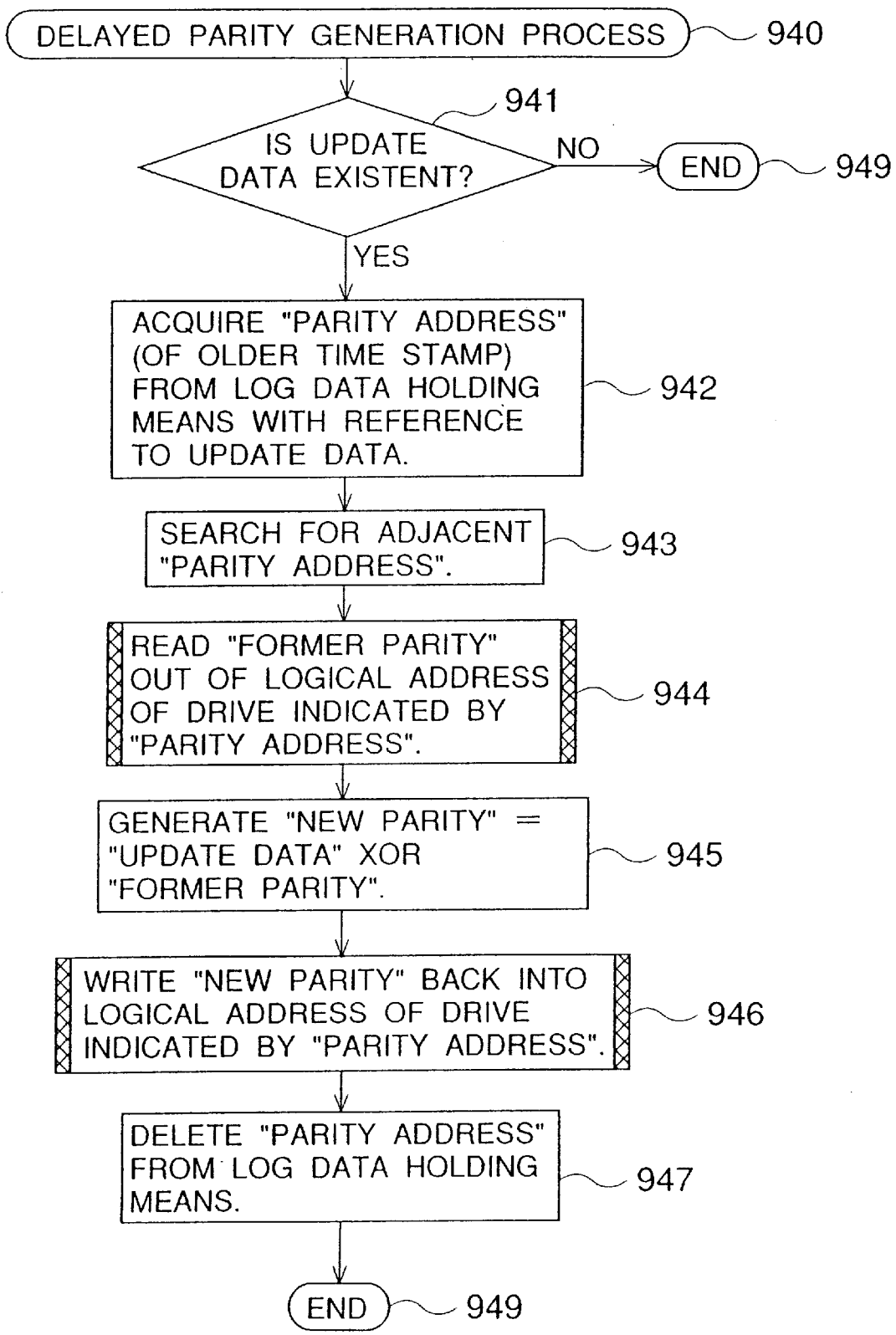
FIG. 13 is a flow chart showing the delayed parity generation process when a plurality of update data items are held.

As illustrated in FIG. 13, in the delayed parity update process (940), the first "parity data" is fetched from the log data holding means 108, and the number and address of the magnetic disk indicated by the fetched data is set as the reference of the "parity addresses" (942). In this example, the reference address is of the ninth logical block of the disk unit 301. Subsequently, any "parity address" of the same disk unit number and the adjacent logical block number is sought out of the log data holding means 108 (943). In this example, also the "update data" corresponding to the tenth logical block of the disk unit 301 has already been held. Therefore, the two "update data" items are collectively subjected to the delayed parity generation processes.

In the delayed parity generation processes on this occasion, "former parity" data items are respectively read out of the ninth and tenth logical blocks of the disk unit 301 (944). Subsequently, the exclusive OR's (XOR's) between the "update data" items and the "former parity" data items are respectively calculated to generate "new parity" data items (945). The "new parity" data items are respectively written back into the ninth and tenth logical blocks of the disk unit 301 (946), and deleted from the log data holding means 108 (947). Owing to the deletions from the log data holding means 108, the blocks 120 of the update data holding means 107 are also released. Thus, remaining "update data" involved in the write process of the "data 5" can be held.

Here, the first "parity address" serving as the reference has been selected from among the contents of the log data holding means 108. The time stamps held in the log data holding means 108 along with the "parity addresses" are utilized as one criterion for the selection (942). Specifically, the delayed parity generation processes are begun with the oldest "update data" existent in the log data holding means 108. Considered as another criterion is the LRU (least recently used) rule which is generally utilized for managing caches.

Regarding a method of searching for the "update data" which correspond to the adjacent "parity addresses" (943), the logical block numbers need not be perfectly consecutive as in the above example. It is also allowed to adopt, for example, an algorithm which searches for logical blocks existing within ±32 logical blocks reckoned from the number of a reference logical block.

Second Embodiment

Figure 5:
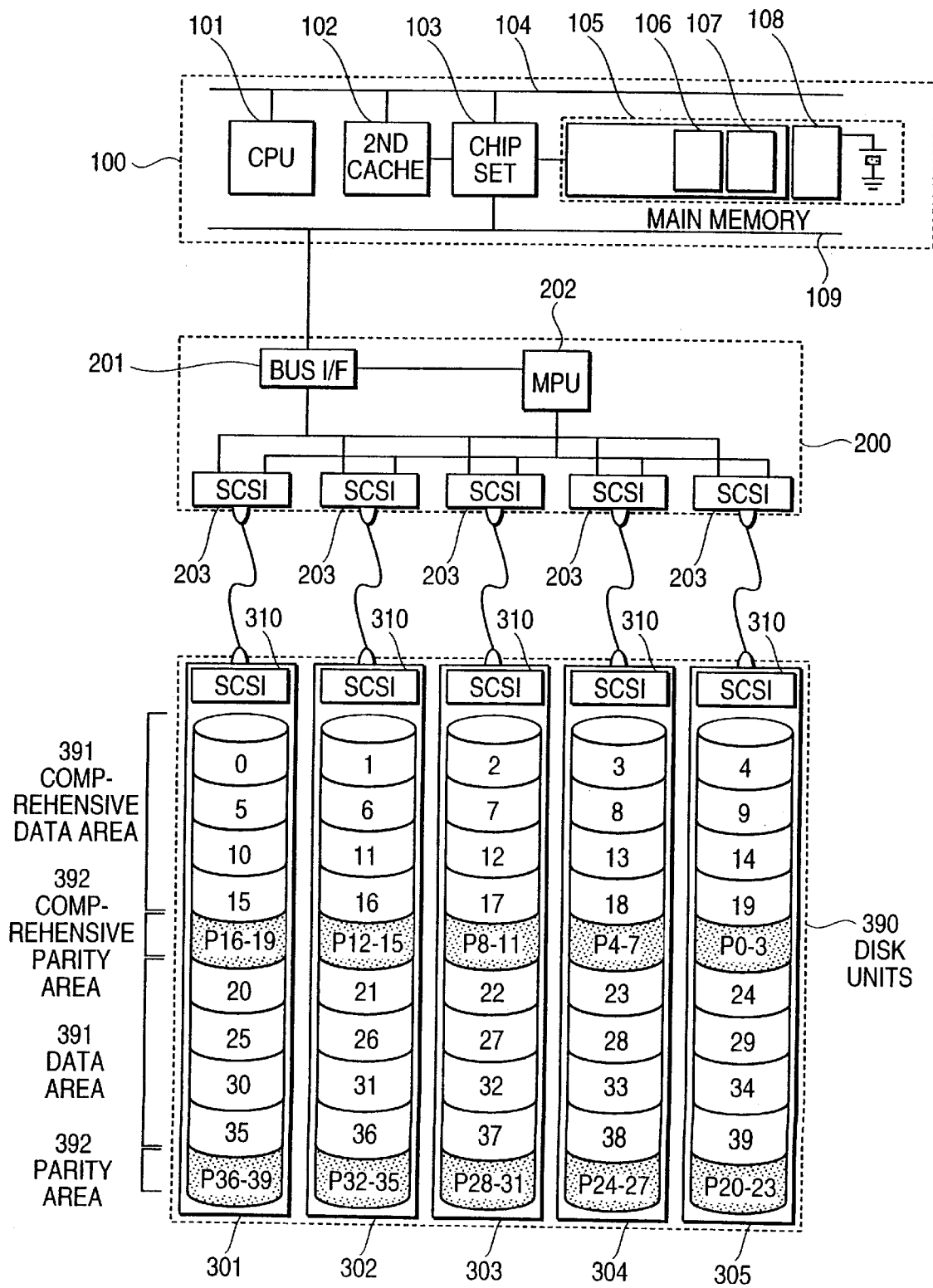
FIG. 5 is a block diagram showing a disk array system in the second embodiment of the present invention.

FIG. 5 illustrates the architecture of the second embodiment of the disk array system according to the present invention. The difference of the second embodiment from the first embodiment shown in FIG. 1 consists in the placement of the data and parity areas in the group of disk units 390. The group of disk units 390 shown in FIG. 1 is configured of one comprehensive data area 391 and one comprehensive parity area 392. On the other hand, the group of disk units 390 shown in FIG. 5 is configured of a plurality of (two, in FIG. 5) comprehensive data areas 391 and a plurality of (two, in FIG. 5) comprehensive parity areas 392. In such a different configuration, the calculating method of the address conversion means (1015 shown in FIG. 14) needs to be changed, but the functions of the other means need not be changed.

Owing to the configuration in the second embodiment, the physical position s of the data areas and the parity areas can be brought nearer to each other, so that time periods for the movements of a head between the data area and the parity area at the start and end of the parity generation process can be shortened.

Moreover, when the disk array system has shifted to a synchronous parity generation system in which the parity generation process is not delayed, a time period for a write process can be shortened.

Third Embodiment

Figure 6:
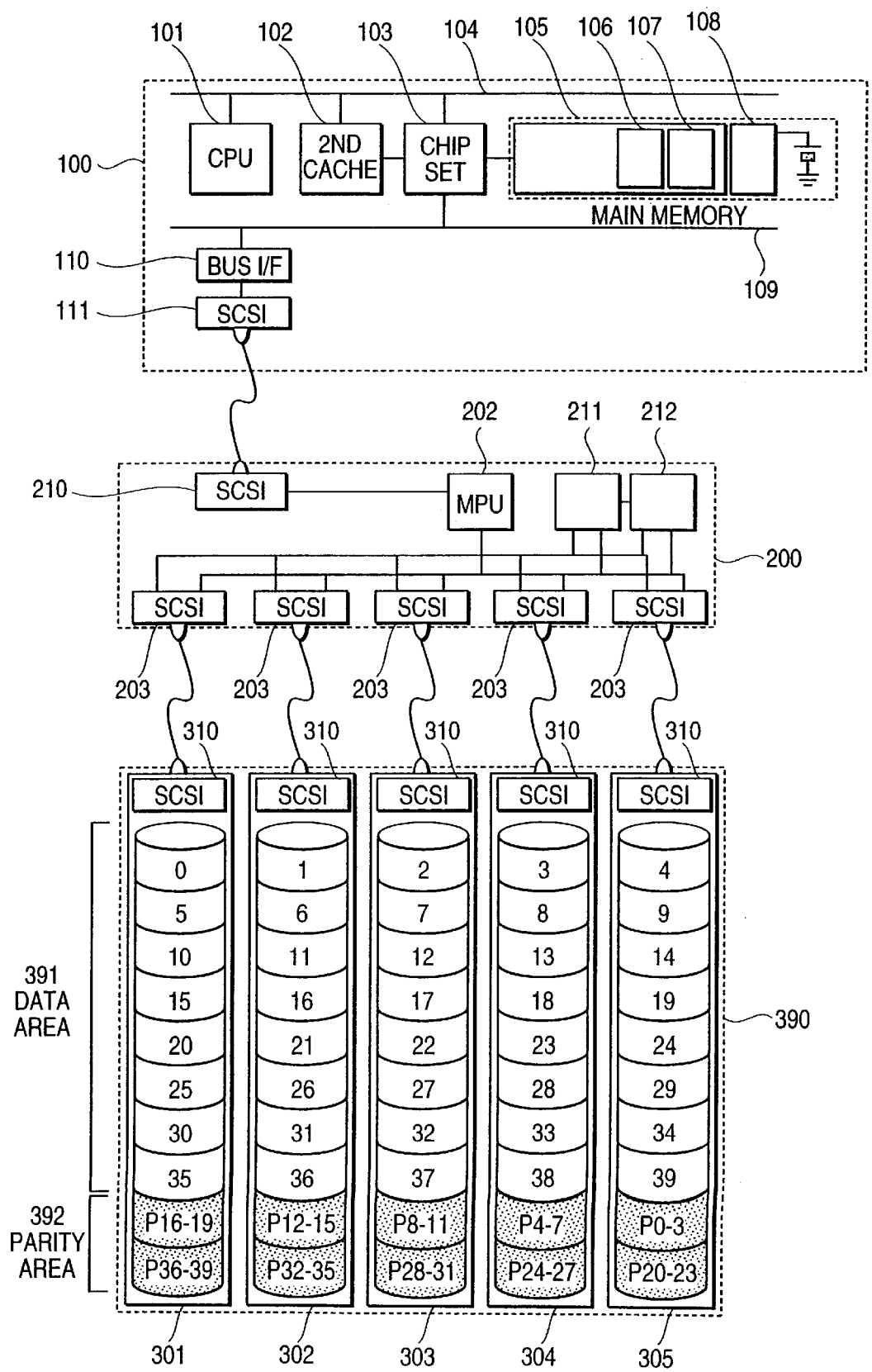
FIG. 6 is a block diagram showing a disk array system in the third embodiment of the present invention.

FIG. 6 illustrates the architecture of the third embodiment of the disk array system according to the present invention. This disk array system is broadly constructed of three sections; a host system 100, an array board 200, and a group of magnetic disk units 390 arranged in the form of arrays (magnetic disk units 301 thru 305).

The host system 100 is constituted by a CPU 101, a second cache 102, a chip set 103 and a main memory 105. The CPU 101, second cache 102 and chip set 103 are interconnected by a CPU bus 104. The main memory 105 includes therein a former data holding portion 106, an update data holding portion 107, and a log data holding portion 108 rendered nonvolatile. Besides, an extension bus 109 is extended from the chip set 103, and a SCSI interface 111 is connected to the extension bus 109 through a bus interface 110.

The array board 200 is connected with the SCSI controller 111 of the host system 100 by a SCSI controller 210. In addition to the SCSI controller 210, the array board 200 includes an MPU 202, SCSI controllers 203 in the number of five, delayed parity generation means 211, a buffer 212, and parity address decision means implemented by software in the MPU 202. As mentioned above, the group of magnetic disk units 390 includes the five magnetic disk units 301 thru 305. Each of the magnetic disk units 301 thru 305 has a a SCSI interface 310, which is connected with the corresponding SCSI controller 203 of the array board 200 by cable. Besides, the group of magnetic disk units 390 are divided into data areas 391 for holding therein storage data which are transferred from the host system 100, and parity areas 392 for holding therein parity data which are redundant data peculiar to such a disk array system.

Here, former data search means, update data search means and update data generation means provided in accordance with the present invention are implemented as software in the CPU 101. Address conversion means for data distribution/collection processing peculiar to such an array disk system is also implemented as software in the CPU 101.

As stated above, the disk array system of this embodiment also operates as the combinations of the functions fulfilled by the respective portions of the host system 100, the array board 200 and the group of magnetic disk units 390. It is therefore meaningless to isolate the disk array system as such.

Here, a read process (a process for reading data) and a write process (a process for writing data) in the disk array system constructed as shown in FIG. 6 are basically the same as those of the first embodiment, respectively. In the first embodiment, the array board 200 is directly coupled to the extension bus 109 in the connection thereof with the host system 100, whereas in the third embodiment, it is connected through the SCSI controllers 210 and 111. Therefore, merely the transfer of data between the host system 100 and the array board 200 is different. With the architecture of FIG. 6, however, the method of a delayed parity generation process becomes different because the delayed parity generation means 211 is provided in the array board 200.

Delayed Parity Generation Process

The delayed parity generation process will be described with reference to FIG. 6. This delayed parity generation process is started asynchronously with a write process. First, the update data search means searches the update data holding means 107 for "update data". If the "update data"

does not exist, the delayed parity generation process ends. On the other hand, if the "update data" does exist, it is transferred to the array board 200 on the basis of a "parity address". The parity address decision means implemented in the MPU 202 of the array board 200 decides whether a logical address at which data is to be written lies in the comprehensive data area 391 or comprehensive parity area 392 of the group of magnetic disk units 390.

When the "update data" has been transferred under such setting, the parity address decision means finds the write into the parity area 392. Accordingly, the delayed parity generation means 211 stored the "update data" transferred from the host system 100, in the buffer 212. Further, "former parity" is read out of the logical address indicated by the "parity address", and the exclusive OR (XOR) between the "former parity" and the "update data" is calculated to generate "new parity". This "new parity" is written back into the logical address indicated by the "parity address". When the write of the "update data" has ended, the corresponding "parity address" is deleted from the log data holding means 108 in the host system 100. In this embodiment, as in the first embodiment, the "new parity" is held as the "update data". Therefore, the read-out of the "former data" in a delayed parity update process can be reduced once when the held data is hit, and the speed of the delayed parity update process can be heightened.

According to the architecture of FIG. 6, most of the delayed parity generation processes are performed in the array board 200. Therefore, the third embodiment can relieve the processing load of the host system 100 as compared with the first embodiment.

Fourth Embodiment

Figure 7:
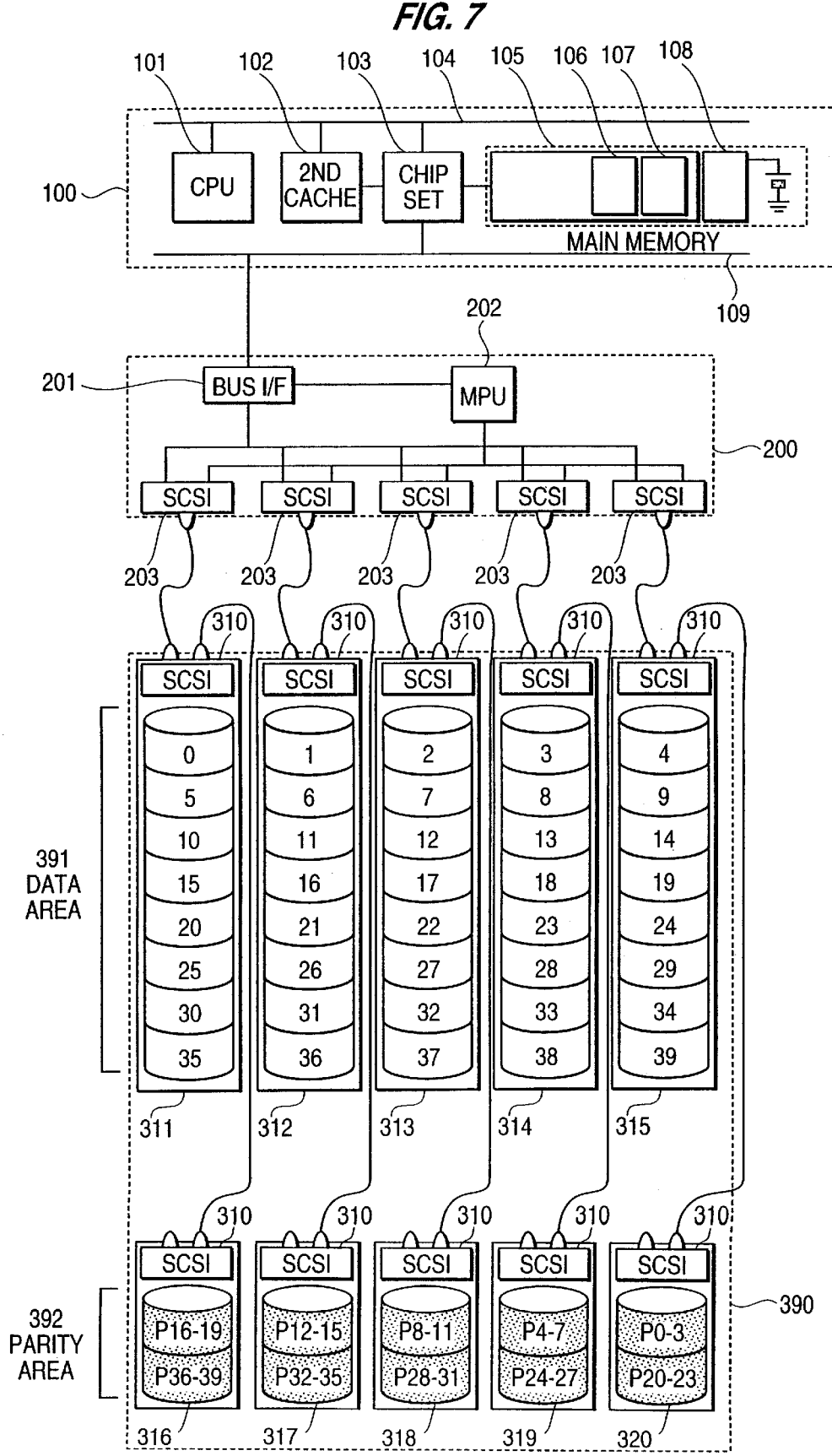
FIG. 7 is a block diagram showing a disk array system in the fourth embodiment of the present invention.

FIG. 7 illustrates the architecture of the fourth embodiment of the disk array system according to the present invention. This disk array system is broadly constructed of three sections; a host system 100, an array board 200, and a group of magnetic disk units 390 arranged in the form of arrays (magnetic disk units 311 thru 320).

The constructions and basic functions of the host system 100 and the array board 200 are the same as in the first embodiment. It is necessary, however, to change the calculating method of address conversion means. (Of course, the fourth embodiment can also be constructed even when the host system 100 and array board 200 in the third embodiment are employed.)

The feature of the architecture in FIG. 7 is that, in the group of magnetic disk units 390 the group has a structure of a variation (a more general case is shown in FIG. 10C) of the separate parity placement process shown in FIG. 1, and, the magnetic disk units 316 thru 320 each including only a parity area 392 form the arrays. Accordingly, the other magnetic disk units 311 thru 315 form the arrays by only data areas 391.

It is as stated before that, when the delayed parity generation system of the present invention is adopted, only the data area is accessed in the write process. Also in the read process, only the data area is accessed. With the architecture of FIG. 7, therefore, accesses are issued to only the magnetic disk units 311~315 constituting the comprehensive data area 391 of the group of magnetic disk units 390, in the read/write processes instructed by the application or the like of the host system 100. In contrast, accesses are issued to the magnetic disk units 316~320 constituting the comprehensive parity area 392 of the group of magnetic disk units 390, in both the read-out of "former parity" and the write-back of "new parity" in the delayed parity generation process.

As stated above, the areas to be accessed in the read/write process and the delayed parity generation process are different from each other. Therefore, the architecture shown in FIG. 7 permits the read/write process and the delayed parity generation process to proceed in parallel.

When the read/write process and the delayed parity generation process are permitted to proceed in parallel, the read/write process can be executed even when it arises during the delayed parity generation process. Moreover, it is possible to enhance the versatility of the timing at which the delayed parity generation process is started. Further, when the read/write process and the delayed parity generation process are alternately executed in the first embodiment, a head reciprocates between the comprehensive data area and the comprehensive parity area. In contrast, such head movements are dispensed with in the fourth embodiment. Accordingly, the speed of the parity update process can be heightened.

Fifth Embodiment

Figure 8:
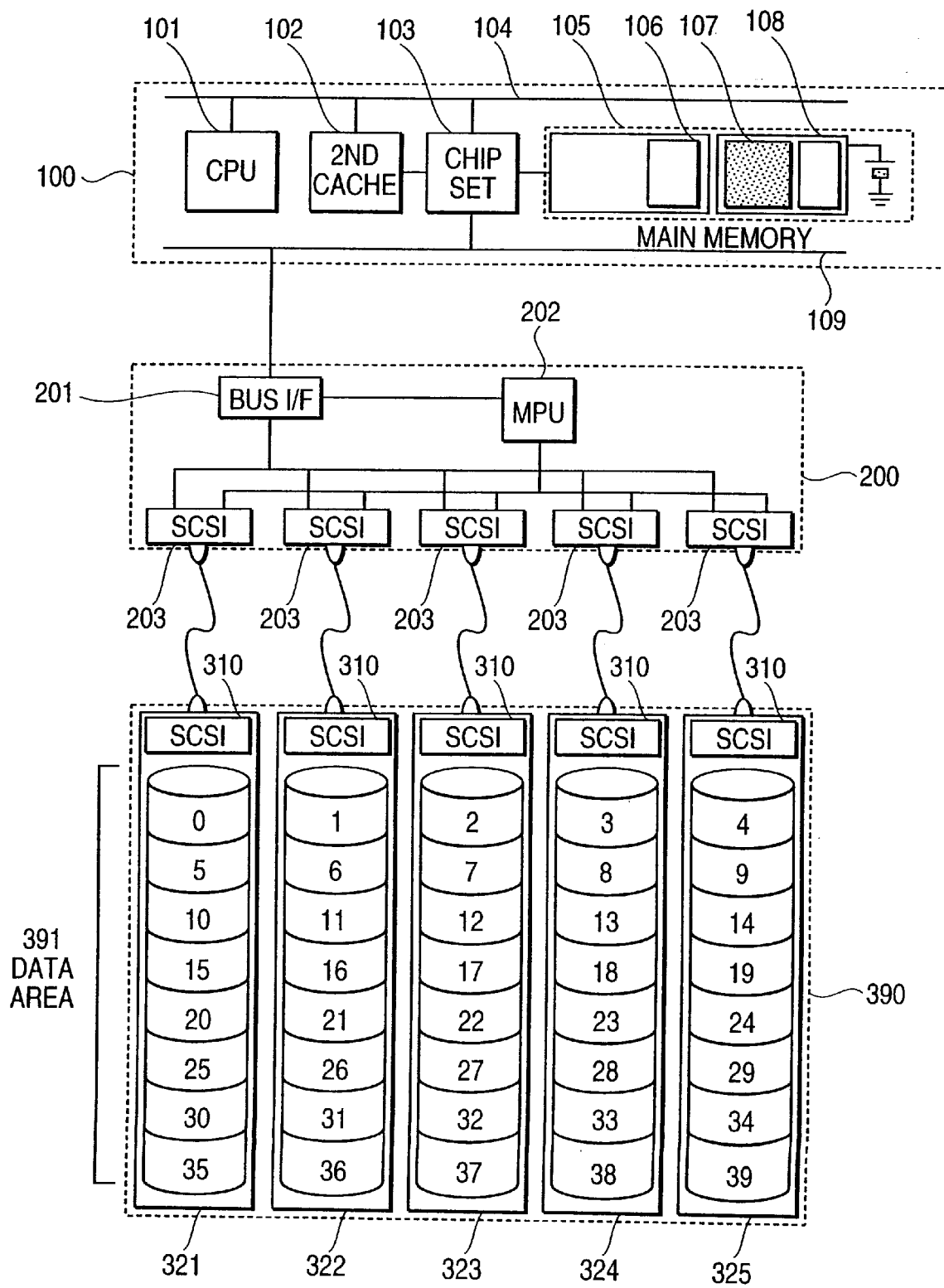
FIG. 8 is a block diagram showing a disk array system in the fifth embodiment of the present invention.

FIG. 8 illustrates the architecture of the fifth embodiment of the disk array system according to the present invention. This disk array system is broadly constructed of three sections; a host system 100, an array board 200, and a group of magnetic disk units 390 arranged in the form of arrays (magnetic disk units 321 thru 325).

The host system 100 is constituted by a CPU 101, a second cache 102, a chip set 103 and a main memory 105. The CPU 101, second cache 102 and chip set 103 are interconnected by a CPU bus 104. The main memory 105 includes therein a former data holding portion 106, an update data holding portion 107 rendered nonvolatile, and a log data holding portion 108 rendered nonvolatile. Besides, an extension bus 109 is extended from the chip set 103.

The array board 200 is connected to the extension bus 109 by the use of a bus interface 201. In addition to the bus interface 201, the array board 200 includes an MPU 202, and five SCSI controllers 203.

As mentioned above, the group of magnetic disk units 390 include the five magnetic disk units 321 thru 325. Each of the magnetic disk units 321 thru 325 has an SCSI interface 310, which is connected with the corresponding SCSI controller 203 of the array board 200 by cable. Besides, the group of magnetic disk units 390 have only a comprehensive data area 391 for holding therein storage data which are transferred from the host system 100.

Here, former data search means, update data search means and update data generation means provided in accordance with the present invention are implemented as software in the CPU 101. Only in this embodiment is delayed parity generation means is not provided. The reason therefor is that an update data generation process which is executed by the update data generation means becomes, in effect, a parity generation process.

Address conversion means for data distribution/collection processing peculiar to such a disk array system is also implemented as software in the CPU 101.

As stated above, also the disk array system of this embodiment operates as the combinations of the functions fulfilled by the respective portions of the host system 100, the array board 200 and the group of magnetic disk units 390. It is therefore meaningless to isolate the disk array system as such.

Here, a read process and a write process in the disk array system constructed as shown in FIG. 8 will be described.

Further, a delayed parity generation process peculiar to the disk array system of the present invention will be described.

Initialization

In using the disk array system of the architecture shown in FIG. 8, the update data holding portion 107 must be first initialized. It is necessary to read out data every stripe from the group of magnetic disk units 390, to generate corresponding "update data" (parity) and to store the generated data in the update data holding portion 107. In the embodiment of FIG. 8, the update data holding portion 107 is made nonvolatile, and it may therefore be initialized only once when the disk array system is constructed. If the update data holding portion 107 is volatile, it needs to be initialized each time the power supply of the system is closed. Even in the architecture of FIG. 8, the initializing process needs to be performed again when the matching between the contents of the update data holding portion 107 and the magnetic disk units 321~325 is lost due to any unexpected accident.

Read Process

Now, the read process will be described with reference to FIG. 8. When an instruction for reading out data has been issued by an application or the like in the host system 100, the "data address" of the desired data is calculated by the address conversion means. The former data search means searches the former data holding means 106 for the desired data on the basis of the "data address". If the desired data exists in the former data holding means 106, it is transferred from this means 106, whereupon the read process is ended.

On the other hand, if the desired data does not exist in the former data holding means 106, it is read out of the logical address indicated by the "data address". The desired data read out is delivered to the application or the like having issued the read instruction, and it is also held in the former data holding means 106, whereupon the read process is ended.

Write Process

The write process will be described with reference to FIG. 8. When an instruction for writing data has been issued by an application or the like in the host system 100, the address conversion means calculates the "data address" of the "new data". Besides, the update data search means searches the update data holding means 107 for "update data" corresponding to the "new data". (Herein, as in any other embodiment, the "update data" is shared by a plurality of data items belonging to an identical parity group. By way of example, "data 0~""data 3" in FIG. 1 belong to one parity group and share parity "P0-3". ) Since the update data holding means 107 holds therein update data for all the data items of the magnetic disk units 321~325, the "update data" corresponding to the "new data" can be found out without fail.

The former data search means searches the former data holding means 106 for "former data" on the basis of the "data address". On condition that the "former data" does not exist, it is read out of a logical block indicated by the "data address".

The update data generation means generates new "update data" on the basis of the exclusive OR (XOR) among the "former data", the "new data" and the existent "update data", and overwrites the result into the update data holding means 107.

Thereafter, the "new data" is written into the logical block indicated by the "data address", the end of the write process is reported to the application or the like, and the "new data" is also held in the former data holding means 106.

Owing to the architecture shown in FIG. 8, the update data generation process becomes the virtual parity update process, and the delayed parity generation process need not be performed. Moreover, since all the "update data" items for all the data items exist in the update data holding means 107 within the main memory 105 of the host system 100, the speed of the update data generation process is heightened.

Sixth Embodiment

Figure 9:
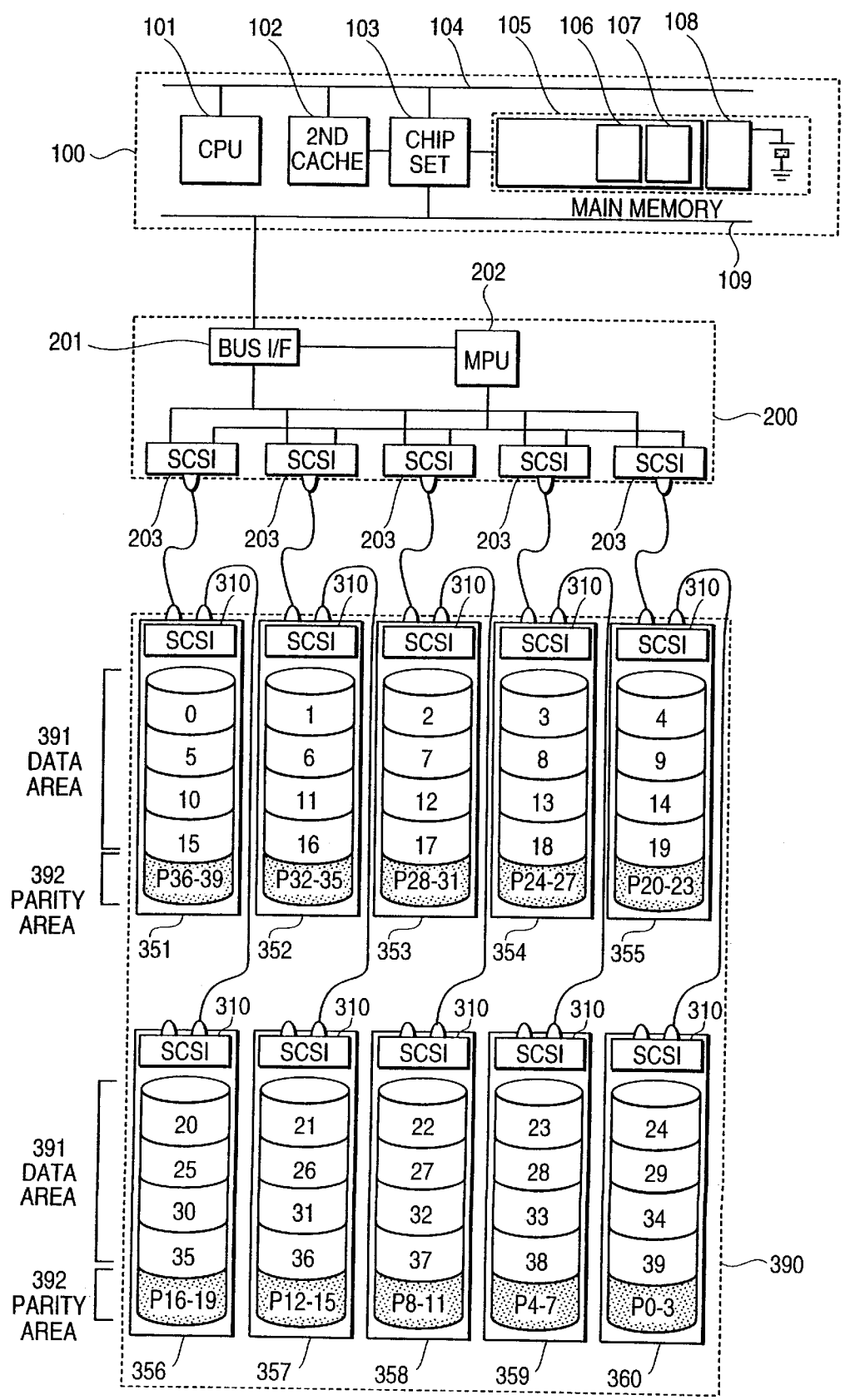
FIG. 9 is a block diagram showing a disk array system in the sixth embodiment of the present invention.

FIG. 9 illustrates the architecture of a disk array system in the sixth embodiment of the present invention. This disk array system is broadly constructed of three sections; a host system 100, an array board 200, and a group of magnetic disk units 390 arranged in the form of arrays (magnetic disk units 351 thru 360).

The constructions and basic functions of the host system 100 and the array board 200 are the same as in the first embodiment. It is necessary, however, to change the calculating method of address conversion means. (Of course, the sixth embodiment can also be constructed even when the host system 100 and array board 200 in the third embodiment are employed.)

The architecture shown in FIG. 9 includes the group of magnetic disk units 390 has a structure of a variation (a more general case is shown in FIG. 10C) of the separate parity placement process shown in FIG. 1, and being constructed of a plurality of subgroups (two subgroups in the case of FIG. 9). The first subgroup is constituted by the magnetic disk units 351 thru 355, while the second subgroup is constituted by the magnetic disk units 356 thru 360. Each of the first and second subgroups is formed with a comprehensive data area 391 and a comprehensive parity area 392. Thus, the parity of data stored in the data area of the first subgroup is stored in the parity area of the second subgroup, while the parity of data stored in the data area of the second subgroup is stored in the parity area of the first subgroup.

As already explained in the fourth embodiment, when the delayed parity generation system of the present invention is adopted, only the data area is accessed in the write process. Also in the read process, only the data area is accessed. Therefore, when the read/write processes instructed by the application or the like of the host system 100 are to be executed for, e.g., the first subgroup in the architecture of FIG. 9, accesses are issued to only the magnetic disk units 351~355 constituting the comprehensive data area 391.

In contrast, when the delayed parity generation process is to be executed for the data of the first subgroup, accesses are issued to the magnetic disk units 356~360 of the second subgroup constituting the comprehensive parity area 392, in both the read-out of "former parity" and the write-back of "new parity".

As stated above, the areas to be accessed in the read/write process and the delayed parity generation process are different from each other. Therefore, especially when accesses localize, in other words, where the access frequencies of the disk units 351~355 of the first subgroup and those 356~360 of the second subgroup are greatly different, it is expected of the multiple-subgroup construction of FIG. 9 to increase the degree of multiplicity (parallel operations) and to heighten the speeds of the read/write process and the parity update process.

Seventh Embodiment.

As to the architecture shown in FIG. 1, processing methods different from those of the first embodiment will be described.

Read Process

First, the read process will be described. When an instruction for reading out data has been issued by the application or the like in the host system 100, that logical block address of the pertinent one of the disk units 301~305 at which the desired data is held is calculated by the address conversion means. The calculated results shall be called the "data address". The former data search means searches the former data holding means 106 for the desired data on the basis of the "data address". If the desired data exists in the former data holding means 106, it is transferred from the holding means 106, whereupon the read process is ended.

On the other hand, if the desired data does not exist in the former data holding means 106, it is read out of the logical address indicated by the "data address". The desired data read out is delivered to the application or the like having issued the read instruction, and it is also held in the former data holding means 106 as well as the update data holding means 107. The difference of this embodiment from the first embodiment is that the "update data" is not held in the update data holding means 107.

Write Process

Next, the write process will be described. Hereinbelow, data to be written anew shall be called "new data", while old data corresponding to the "new data" shall be called "former data". The "former data" signifies data which is recorded in a logical block to have the "new data" written thereinto, in other words, data which is to be overwritten by the "new data" in accordance with the write process.

When an instruction for writing data has been issued by the application or the like in the host system 100, the address conversion means calculates the unit number and the logical block address of the pertinent one of the magnetic disk units 301~305 to store the "new data". The calculated results shall be called the "data address". Further, the address conversion means calculates the unit number and the logical block address of the particular one of the magnetic disk units 301~305 storing parity data which corresponds to the "new data". The calculated results shall be called the "parity address".

Subsequently, the former data search means searches the former data holding means 106 for the "former data" on the basis of the "data address".

On the condition that the "former data" does not exist, it is read out of the logical block indicated by the "data address" and is held in the update data holding means 107. The "former data" held in the update data holding means 107 shall be called the "oldest data". Thereafter, the "new data" is written into the logical block indicated by the "data address", and it is also held in the former data holding means 106. Further, the "parity address" is logged in the log data holding means 108.

On the condition that the "former data" does exist, the "new data" is written into the logical block indicated by the "data address", and it is also overwritten into and held in the former data holding means 106. Further, the "parity address" is logged in the log data holding means 108. Then, the write process is ended. The 531 "new data" held in the former data holding means 106 serves as "former data" in the next process.

Unlike the first embodiment, this embodiment dispenses with the generation of the "update data" in each write process. Thus, when the write processes concentrate locally, the speed of the write process can be heightened. Besides, when the write-back-cache system is conjointly employed, the speed can be heightened still more.

Delayed Parity Generation Process

As in the first embodiment, the delayed parity generation process is started asynchronously with the write process.

First, the log data holding means 108 is searched for a "parity address". If the "parity address" does not exist, the delayed parity generation process is ends.

On the other hand, when the "parity address" is stored, parity data already recorded (called the "former parity") is read out of the logical block indicated by the "parity address".

Subsequently, the exclusive OR (XOR) among the three data items of the "former parity", the "oldest data" held in the update data holding means 107 in correspondence with the "parity address", and the "former data" held in the former data holding means 106 in correspondence with the "parity address" is calculated to generate "new parity". Further, the "parity address" is deleted from the log data holding means 108. Then, the process is ends.

The seventh embodiment can be used conjointly with the first embodiment.

According to the present invention, the following effects can be brought forth:

Since the write of data and the update of parity can be executed asynchronously, lowering in the processing speed of a write process can be relieved.

A system having a long life of power supply can be constructed at a comparatively low cost by rendering log data holding means nonvolatile.

The speed of a parity update process can be heightened by employing a separate parity placement system together with the asynchronous parity update.

Even in the parity update process, delayed parity update means transfers update data items held in update data holding means, to parity areas collectively. Therefore, the speed of the parity update process can be heightened still more.

When arrays are formed as a plurality of subgroups, the subgroup for storing data therein and the subgroup for storing parity therein are respectively prescribed, whereby the subgroup corresponding to the write of the data and the subgroup corresponding to the update of the parity become different. Therefore, the data write process and the parity update process can be executed in parallel, and the speeds of the read/write processes and the parity update process in the multiple-subgroup construction can be heightened.

Since RAID functions are implemented by software, the power of a CPU on a host side can be effectively used, and a main memory can be utilized in cache fashion. Further, when the number of SCSI channels in an array board is limited for small-capacity applications, the architecture of a disk array system can be simplified, and the cost thereof can be sharply curtailed.

The response rate and data transfer rate of the disk array system can be heightened by a direct coupling system in which the internal bus of the host is directly coupled with the bus of the array board by an interface.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An array type disk system, comprising:

a plurality of memory units each storing data therein; and an array controller, which assumes said plurality of memory units to logically be a single memory, to read and write the data from and into said memory units and to generate redundant data from data to be written and write the data into said memory units;

wherein said array type system includes at least one data area and at least one redundant data area in which a part or whole of said data holding area has a size which is not smaller than:

s×n×(n−1), and part or whole of said redundant data holding area has a size which is not smaller than s×n, wherein "s" denotes a length of data distribution units of said array type disk system and "n" denotes a number of disk units included in said single logical memory.

* * * * *